United States Patent
Pettigrew

(10) Patent No.: US 6,445,816 B1
(45) Date of Patent: *Sep. 3, 2002

(54) COMPOSITING VIDEO IMAGE DATA

(75) Inventor: Daniel Pettigrew, Quebec (CA)

(73) Assignee: Autodesk Canada Inc., Quebec (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,421

(22) PCT Filed: Sep. 12, 1997

(86) PCT No.: PCT/IB97/01104

§ 371 (c)(1),
(2), (4) Date: Nov. 16, 1998

(87) PCT Pub. No.: WO98/11510

PCT Pub. Date: Mar. 19, 1998

(30) Foreign Application Priority Data

Sep. 12, 1996 (GB) ................................. 9619119

(51) Int. Cl.[7] .............................................. G06K 9/00
(52) U.S. Cl. ...................................... 382/162; 382/165
(58) Field of Search ................... 382/162–165, 382/166, 167, 168, 169, 170, 171, 172, 173, 174, 175, 176, 177, 178, 179, 180, 282, 284, 285, 302, 286–287, 291, 293–295, 298, 307; 358/22

(56) References Cited

U.S. PATENT DOCUMENTS

| 4,864,388 A | | 9/1989 | Skrydstrup | 358/22 |
| 4,908,874 A | * | 3/1990 | Gabriel | 382/41 |
| 5,105,469 A | * | 4/1992 | MacDonald et al. | 382/17 |
| 5,218,432 A | * | 6/1993 | Wakeland | 358/22 |
| 5,268,754 A | * | 12/1993 | Van de Capelle et al. | 358/527 |
| 5,301,016 A | | 4/1994 | Gehrmann | 348/586 |
| 5,347,622 A | | 9/1994 | Takemoto et al. | 395/135 |
| 5,455,633 A | | 10/1995 | Gehrmann | 348/587 |
| 5,497,431 A | * | 3/1996 | Nakamura | 382/162 |
| 5,585,944 A | * | 12/1996 | Rodriguez | 358/500 |
| 5,630,037 A | * | 5/1997 | Schindler | 395/131 |
| 5,696,839 A | * | 12/1997 | Siegeritz | 382/162 |
| 5,812,214 A | * | 9/1998 | Miller | 348/587 |
| 5,812,694 A | * | 9/1998 | Mahy | 382/162 |
| 5,850,472 A | * | 12/1998 | Alston et al. | 382/162 |
| 5,852,673 A | * | 12/1998 | Young | 382/164 |
| 5,982,924 A | * | 11/1999 | Power et al. | 382/162 |
| 6,128,046 A | * | 10/2000 | Totsuka et al. | 348/590 |

FOREIGN PATENT DOCUMENTS

| EP | 0735 511 A2 | 10/1996 | ........... G06T/11/00 |
| FR | 2 681 967 | 4/1993 | ........... G06F/15/66 |
| WO | WO 98/11510 | 3/1998 | ........... G06T/11/00 |

OTHER PUBLICATIONS

Poirson, Allen B. & Wandell, Brian A.: "Pattern–color separable pathways predict sensitivity to simple colored patterns," Dept. of Psychology, Stanford University, Stanford, CA 94305, Vision Research, Feb. 1996, pp. 1–27.

Glassner, Andrew S., Book: "Principles of Digital Image Synthesis", Chapter 2: "2.1 Perceptually Uniform Color Spaces: $L^*u^*v^*$ and $L^*a^*b^*$", vol. 1, 1–69, 1995.

* cited by examiner

Primary Examiner—Phuoc Tham
Assistant Examiner—Amir Alavi
(74) Attorney, Agent, or Firm—Gates & Cooper LLP

(57) ABSTRACT

Image data having a plurality of pixel is processed. Each pixel is represented by three color components (RGB) defining a position within color-space. A base color is identified and a distance in color-space between an input color and said base color is calculated. A control value, which may be used as a basis for a chroma-suppress or a chroma-key etc, is produced in response to the calculated distance.

18 Claims, 22 Drawing Sheets

If dominant base color component = BLUE :

$$C = \sqrt{BLUE^2 + RED^2}$$

GREEN rotate angle $= -a\cos\left(\dfrac{BLUE}{C}\right)$

RED rotate angle $= a\cos\left(\dfrac{C}{\sqrt{C^2 + GREEN^2}}\right)$

Scale $= \dfrac{1}{BLUE}$

If dominant color component = GREEN :

$$C = \sqrt{GREEN^2 + BLUE^2}$$

RED rotate angle $= -a\cos\left(\dfrac{GREEN}{C}\right)$

BLUE rotate angle $= a\cos\left(\dfrac{C}{\sqrt{C^2 + RED^2}}\right)$

Scale $= \dfrac{1}{GREEN}$

Figure 13B

If dominant color is = RED :

$$C = \sqrt{GREEN^2 + RED^2}$$

BLUE rotate angle $= -a\cos\left(\dfrac{RED}{C}\right)$

GREEN rotate angle $= a\cos\left(\dfrac{C}{\sqrt{C^2 + BLUE^2}}\right)$

Scale $= \dfrac{1}{RED}$

Figure 13C $$1502 \sim \begin{bmatrix} R_i \\ G_i \\ B_i \\ A \end{bmatrix} \times mF \underset{1501}{\underbrace{\phantom{mF}}} = \begin{bmatrix} U \\ V \\ K \\ 1 \end{bmatrix} \sim 1503$$

$$1503 \sim \begin{bmatrix} U \\ V \\ K \\ 1 \end{bmatrix} \times mB \underset{1504}{\underbrace{\phantom{mB}}} = \begin{bmatrix} R_F \\ G_F \\ B_F \\ A \end{bmatrix} \sim 1505$$

$$1501 = \begin{bmatrix} i_{00,F} & i_{10,F} & i_{20,F} & i_{30,F} \\ i_{01,F} & i_{11,F} & i_{21,F} & i_{31,F} \\ i_{02,F} & i_{12,F} & i_{22,F} & i_{32,F} \\ i_{03,F} & i_{13,F} & i_{23,F} & i_{33,F} \end{bmatrix}$$

$$1504 = \begin{bmatrix} i_{00,B} & i_{10,B} & i_{20,B} & i_{30,B} \\ i_{01,B} & i_{11,B} & i_{21,B} & i_{31,B} \\ i_{02,B} & i_{12,B} & i_{22,B} & i_{32,B} \\ i_{03,B} & i_{13,B} & i_{23,B} & i_{33,B} \end{bmatrix}$$

Figure 15

1601
LET MAXIMUM ALLOWABLE SUPPRESSION BE DENOTED BY SUPP_MAX

FOR MAXIMUM ALLOWABLE SUPPRESSION
$B_F$ = MINIMUM ( $R_F$ OR $G_F$ )

FOR THE CASE WHERE MINIMUM ( $R_F$ OR $G_F$ ) = $R_F$,
$B_F = R_F$

1602
(a) $B_F = U \cdot i_{02,B} + V \cdot i_{12,B} + K_{B=R} \cdot i_{22,B} + i_{32,B}$
(b) $R_F = U \cdot i_{00,B} + V \cdot i_{10,B} + K_{B=R} \cdot i_{20,B} + i_{30,B}$

1603
SUBSTITUTING EQUATIONS 2 (a) AND 2 (b) IN $B_F = R_F$ GIVES :

$$K_{B=R} = \frac{U \cdot i_{02,B} + V \cdot i_{12,B} + i_{32,B} - (U \cdot i_{00,B} + V \cdot i_{10,B} + i_{30,B})}{(i_{20,B} - i_{22,B})}$$

1604
SUPP_MAX IS GIVEN BY :

$K_{B=R} = K(1 - \text{SUPP\_MAX})$

OR : $\text{SUPP\_MAX} = 1 - \dfrac{K_{B=R}}{K}$

1605
SUBSTITUTING EQUATION 3 IN EQUATION 4 GIVES :

$$\text{SUPP\_MAX} = 1 - \frac{U \cdot i_{02,B} + V \cdot i_{12,B} + i_{32,B} - (U \cdot i_{00,B} + V \cdot i_{10,B} + i_{30,B})}{K \cdot (i_{20,B} - i_{22,B})}$$

Figure 16

COMPOSITING VIDEO IMAGE DATA

TECHNICAL FIELD

The present invention relates to a method and apparatus for digitally compositing video image data, wherein first image frames are derived from a required foreground image recorded against an unrequired background image such that a compositing or blending process results in said unrequired background being replaced by a new background image.

BACKGROUND

Techniques for modifying image data after the data has been recorded have been known for some time. Originally, manual "touching-up" operations were performed directly upon cinematographic film and later photographic mattes were produced allowing two or more filmed images to be combined as a composite image, thereby simulating a visual effect which did not actually occur in reality.

Similar techniques have been employed with television and video signals, originally using analog circuitry arranged to process analog television signals, either represented as red green and blue components or as luminance plus chrominance components. When working with video signals, part of the signal may be removed or keyed out at particular times defined by a synchronised key signal or, alternatively, parts of the video signal may be suppressed to black in response to a suppression signal. These keying signals and suppression signals traditionally have been derived from part of the video signal itself, possibly the luminance signal or possibly the chrominance signals. Thus, techniques for generating these signals have become known as luminance keying (luma-keying) and chrominance keying (chroma-keying) respectively.

Recently, and particularly in the realms of broadcast quality post production, video signals have been manipulated as digital representations where image frames are sampled to produce an array of picture elements (pixels) with each pixel representing a color defined by three color components stored as three numerical values. Thus, traditionally, in video applications, eight bits may be allocated for red green and blue color components at each pixel position or, in accordance with alternative processing schemes, similar allocations of bits may be made for luminance plus color difference signals.

Traditionally, scanned cinematographic film has been processed in an RGB environment with digitized television signals being processed in a luminance plus color difference signal environment, usually identified as YUV. General purpose processing environments have also tended towards a preference for RGB signal processing. Since cinematographic film is of higher color definition, typically 12 bits per color component are used, giving rise to 4096 possible colors per color component. Chroma-keying techniques are exploited both in film post-production and television post-production. Image frames for a foreground image may be derived by recording talent against a background of a particular color, with a highly saturated blue or a highly saturated green being particularly preferred. Required portions of the foreground image should not include colors used in the background image during the production process. A subsequent post production compositing process may then be configured to automatically replace the unrequired background image with a new background image. A key signal is generated at regions identified as belonging to the foreground object which is then used to remove the foreground object from its background. Thus, for example, in action movies talent may appear to be acting within a highly dangerous environment where, in reality the action has been recorded in studio conditions against a green or blue screen background. Provided that the post production compositing is highly accurate, it is possible to produce highly realistic illusions which, from a safety point of view, would not be possible to record directly as a real production sequence.

Often, video or film material will have been recorded, for keying purposes, under less than favourable conditions. Under these circumstances, distinguishing a first set of colors from a second set of colors can be particularly difficult. Furthermore, blending edges are required which represent the interface between the foreground object and the new background, where a degree of blending must occur so as to enhance the realism of the effect. If blending of this type does not occur and hard transitions exist on pixel boundaries, visible artefacts will be present within the image and it will be clear to anyone viewing the resulting clip that the two image parts originated from separate sources.

A problem with known systems is that it may be difficult to adjust color volumes so as to ensure that all key colors are within an internal volume and all non-key colors are outside an external volume, with the required blending regions being outside the internal volume, but inside the external volume.

The term "video" will be used to identify any image signal consisting of a sequence of image frames arranged to create the effect of moving action. This includes true video sources, such as those derived from D1 videotape, in addition to image data derived from other sources, such as cinematographic film. Thus, as used herein, high resolution cinematographic film may be digitised to produce image data which is considered herein as "video data", although not conforming to established video protocols, when used in the narrower sense.

SUMMARY OF THE INVENTION

According to a first aspect of the present invention, there is provided a method of processing image data in which each image has a plurality of pixels and each pixel is represented by three color components defining a position within a color-space, comprising: of identifying a base color; calculating a distance in color-space between an input color and said base color; and producing a control value in relation to said calculated distance.

Preferably, the color-space co-ordinates represent positions on an orthogonal set of axes and said distance is calculated from the sum of each component squared. Preferably, said control value is calculated from the square root of said sum. In a preferred embodiment, color-space co-ordinates are transformed onto an alternative set of orthogonal axes. Preferably, the transformation is performed with reference to said base color.

In a preferred embodiment, the base color is determined from a set of manually selected colors and said base color may be derived from said set by forming a convex hull around said selected colors in color-space.

In a preferred embodiment, the control value is used to suppress in areas of color spill. Alternatively, the control value is used to generate a keying signal and said keying signal may include a tolerance region and a softness region.

According to a second aspect of the present invention, there is provided image data processing apparatus including means for defining image pixels representing color components of a color-space, comprising: means for identifying a base color; calculating means for calculating distance in color-space between an input color and said base color; and means for producing a control value in relation to said calculated distance.

BRIEF DESCRIPTION OF THE DRAWINGS

FIGS. 13A, 13B and 13C illustrate transformation calculations performed in the color suppression process;

FIG. 15 details color-space transformation matrices;

FIG. 16 illustrates determination of the maximum color suppression value utilized in the color suppression process shown in FIG. 4;

DETAILED DESCRIPTION OF THE PREFERRED EMBODIMENTS

Figure 1:
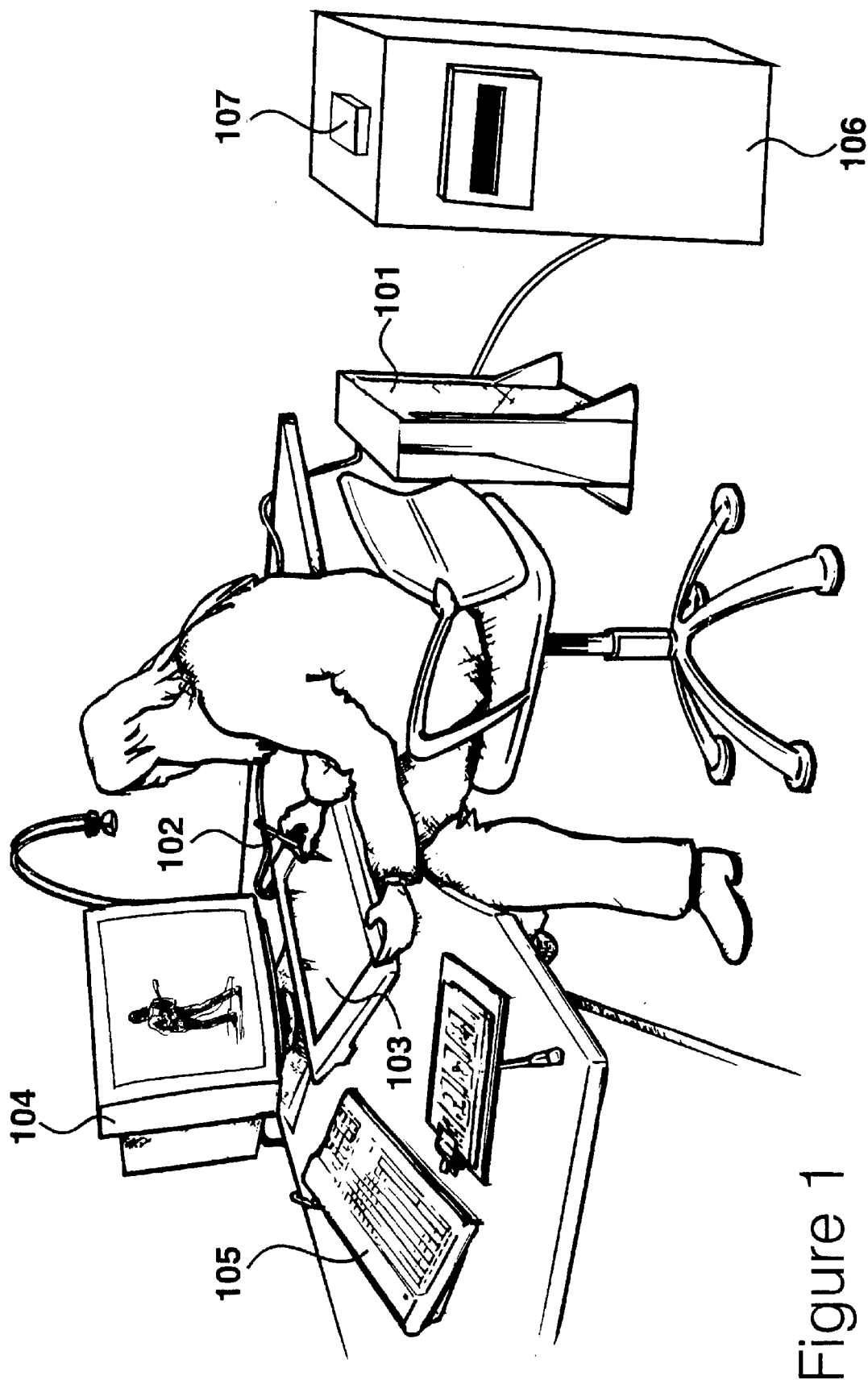
FIG. 1 shows a compositing station arranged to key foreground images against new required background images.

A compositing station is shown in FIG. 1, in which digital representations of image frames are processed within an image data processing system 101. The processing system 101 responds to manual operation of a stylus 102 against a touch table 103 and supplies image data to a monitor 104, in the form of control menus and image clips. An operator may also supply data to the processing system 101 via a manually operable keyboard 105 and images are supplied to processing device 101 from video player 106.

Figure 2:
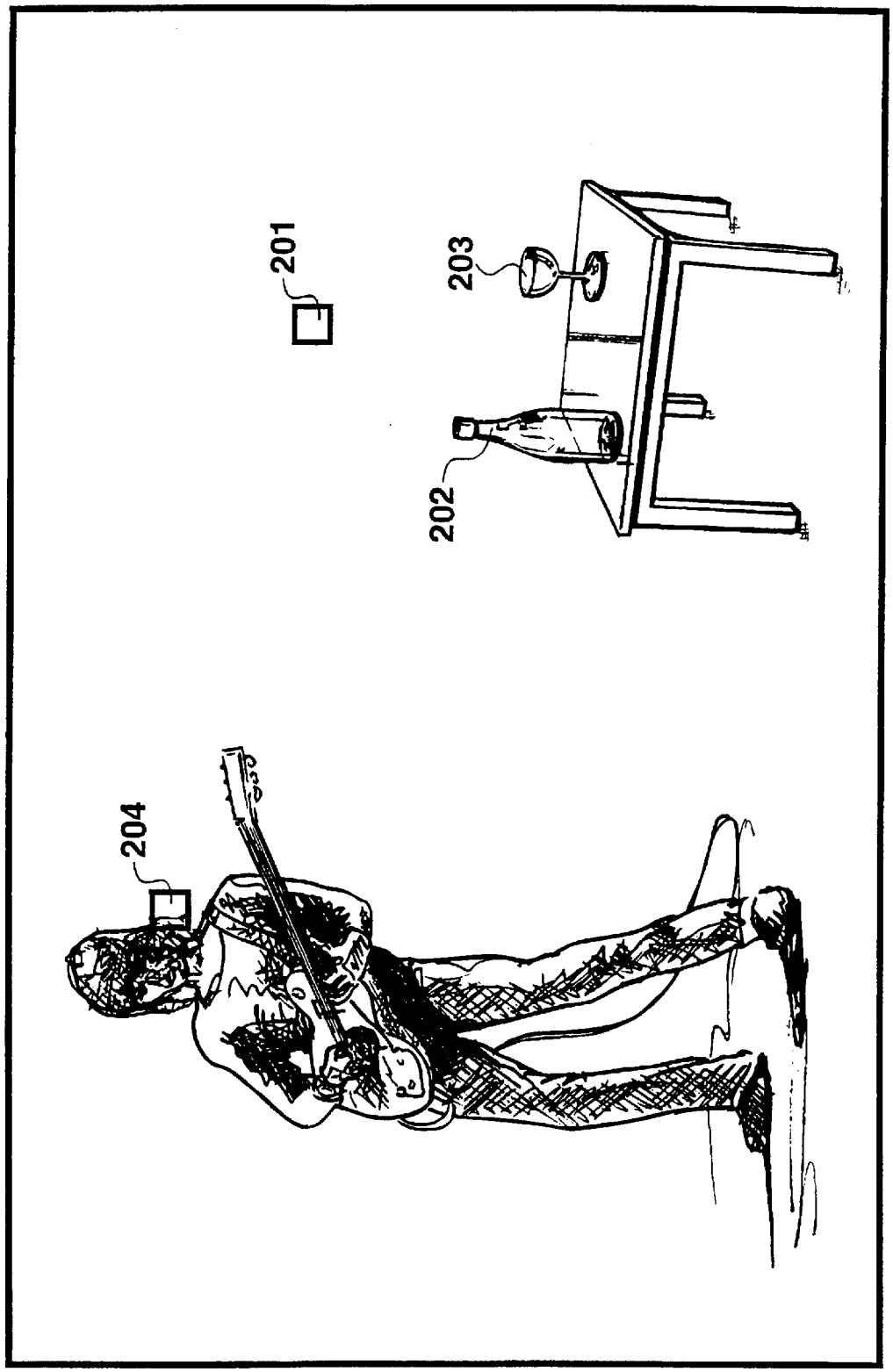
FIG. 2 shows an example of a foreground image to be composited against a new required background, using the equipment identified in FIG. 1.

An example of an image frame displayed on monitor 104 is shown in FIG. 2. In this example, the foreground image scene has been recorded onto cinematographic film in a studio, in which the required foreground talent has been recorded against a saturated blue background. The film has been digitized and a compositing process, effected by system 101, is arranged to remove the unrequired background and to replace it with a new background image. The digitized samples consist of an array of picture elements (pixels) representing red, green and blue color components which are then displayable to the operator, on monitor 104, as a video sequence. However, this video sequence is stored on substantially randomly accessible magnetic disks, to facilitate non-linear editing and compositing.

Typically, eight, ten or 12 bits may be allocated to each of the red, green and blue components which may be visualized as orthogonal coordinates in a three dimensional color-space. Thus, it is possible to visualize color as a three dimensional color space where conventional x, y, z Cartesian spatial co-ordinates are replaced by Cartesian color co-ordinates of red (R), green (G) and blue (B).

Also, like conventional x, y, z-space, color space may be specified by alternative sets of co-ordinates and relationships between co-ordinate sets may be mathematically defined by means of functional transformations, which in turn may be represented by transformation matrices. Thus, a color space may be qualified by a particular co-ordinate set such that each co-ordinate within the space has a particular value defining a particular color. This same color may be defined by an alternative co-ordinate set by applying a matrix transformation upon the numerical values representing the color. Thus, the co-ordinate set may undergo a transformation in color space. However, it should be noted that the actual color itself remains the same and it is merely its representation under an alternative co-ordinate system which changes.

A known alternative co-ordinate set in common usage is the subtractive color set of cyan, yellow, magenta and black (CYMK) used for printing. Thus, as values within this color space become larger, pixel values become darker, whereas in RGB space as values become larger pixel intensities become greater.

Another known color space is that of luminance plus color difference. The luminance axis may be considered as the axis of constant red, green and blue, with color difference values, or hue and saturation values, being defined at positions on planes perpendicular to the luminance axis. Thus, color space, defined in terms of luminance, hue and saturation, represents a cylindrical color space, where hue is defined as an angle with respect to the luminance axis. Within the bounds of a system's resolution, an infinity of color spaces are definable, each having a respective transformation matrix, such that color defined in a first color space may be transformed to a second color space, under the operation of the transformation matrix. However, it should be stressed that the actual color and its conceptualisation as space remain constant with its co-ordinate and it is the co-ordinate definitions which change in accordance with the matrix transformations.

In the present example, color components are recorded as three components representing the primary colors red green and blue (RGB) with eight bits being assigned to each of these components. When performing a chroma keying process each RGB color may be identified as belonging to one of three regions in color space. The first region represents the full key color of the background which will often be a relatively small volume of colors having a relatively high blue component with relatively low red and green components. Surrounding this volume of colors will be the region of colors where a transition is to occur. This set will have blue values that are relatively lower than the hard key set, with red and green values that are relatively higher. This set of color values represent pixels where a key will have an intermediate value (between 1 and 254 in an eight bit system), so as to provide a degree of blending between the foreground object and the new background. Thirdly, a region of color space will exist representing allowed foreground values. In this region, all of the foreground image will be composited with no blending through to the background.

Figure 3:
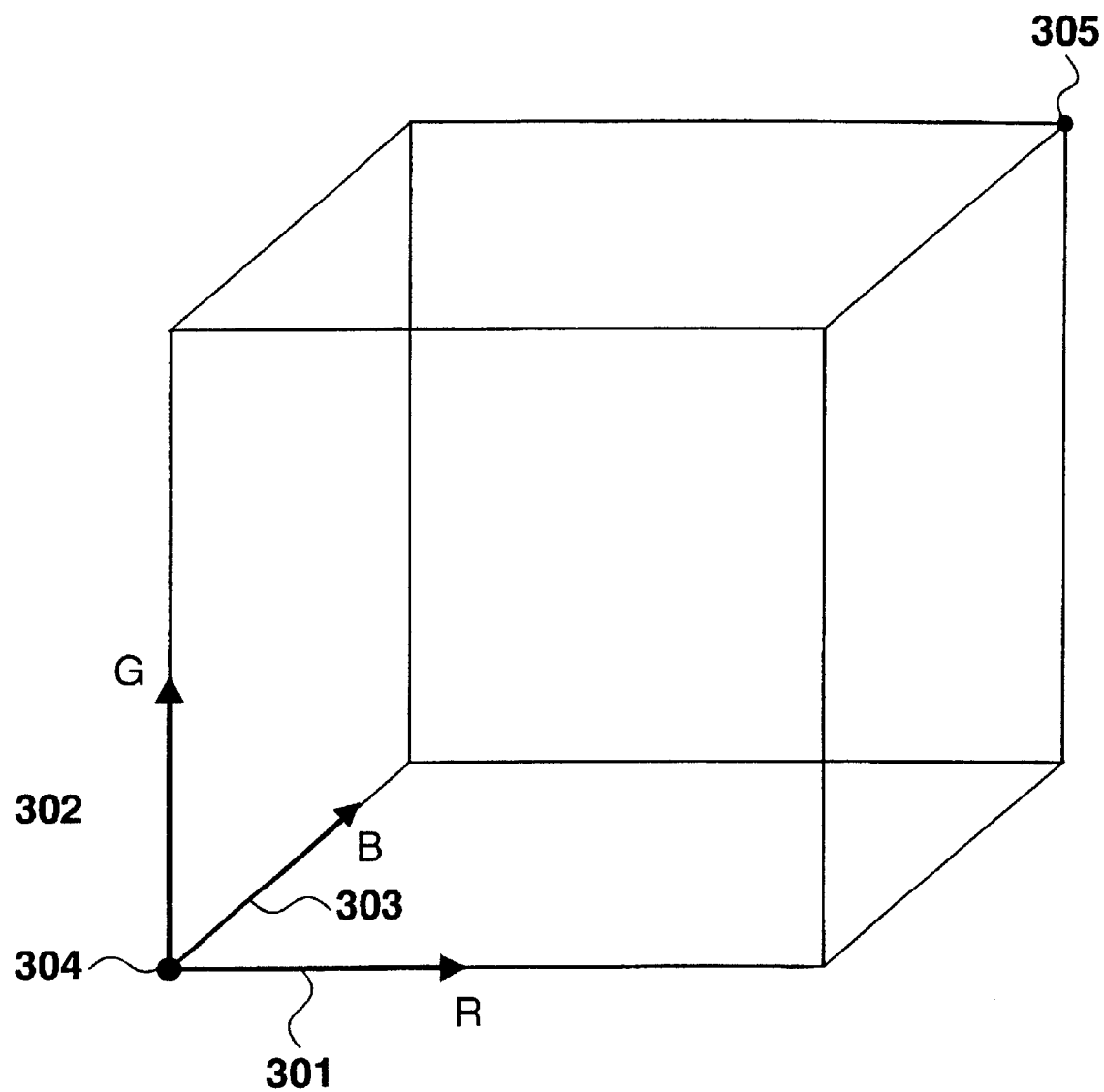
FIG. 3 illustrates the position of a base color within a three dimensional color-space said base color being identified on the unrequired background of the foreground image.

This arrangement of color values within an RGB color space is illustrated in FIG. 3. A three dimensional color space is illustrated in which any point within the space is defined by orthogonal co-ordinates representing red, green and blue components. Thus, axis 301 represents the intensity of the red component, axis 302 represents the intensity of the green component and axis 303 represents the intensity of the blue component. Thus, every pixel within the image may be mapped onto a region within the RGB color space. In this color space the value of RGB (0,0,0) represents black (point 304) and the value of RGB (1,1,1) represents pure white of maximum intensity (point 305).

Figure 4:
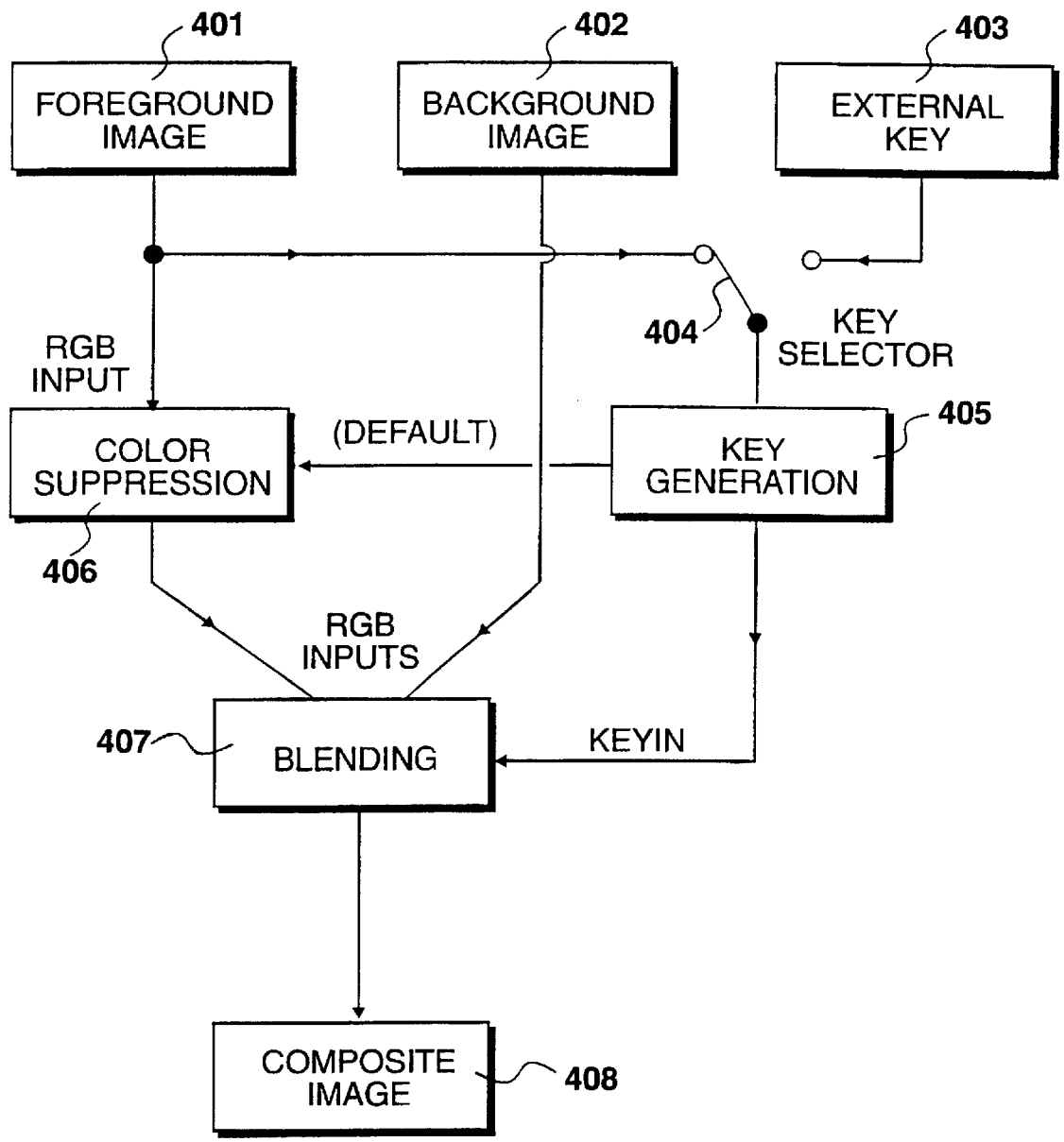
FIG. 4 illustrates a compositing process in which a foreground image is composited with a background image, including processes for key generation and color suppression.

Keying procedures effected by the processor 101 are detailed in FIG. 4. The compositing process consists of compositing the foreground image with the background image and therefore it is necessary to provide a foreground image source 401 in combination with a background image source 402. These images are processed on a pixel by pixel basis and on a frame by frame basis. Color keying of this type is particularly attractive if associated data (the key or matte) may be established which allows a plurality of frames within the clip to be keyed in a single pass. Thus, after control parameters have been established for a particular frame, the same control parameters may be employed for the other frames within the clip, thereby allowing the compositing procedure to be effected at a rate which is much faster than that attainable when generating keys manually.

In some circumstances, keying may be effected using a key generated by external equipment and therefore provision is made for an external key to be supplied to the process, as illustrated at 403. A key selector 404 is provided which, as shown in its left orientation, is configured to allow a key signal or matte to be generated from the foreground image source 401. In its alternative orientation, when positioned to the right, an external key signal is supplied to a key (or matte) generation process 405, although the extent of processing carried out within process 405 will depend upon the quality of the external key supplied to the system. One embodiment of the system operates under the assumption that colors may be defined by three mutually orthogonal axes; effectively defining color as positions in three dimensional Cartesian RGB color-space.

Where careful blending of foreground and background is required the definition of a volume around a particular color of interest, representing colors where a soft key will be produced, becomes a highly sensitive matter which, if not accurately defined, results in the transitional area including regions of the background which should be cut out and/or not including regions of the foreground which should be present. Solutions have been proposed in which this region's color space is defined using highly sophisticated arrangements of boundary planes, effectively defining highly complex polyhedral color space. This is an extremely user intensive and processor intensive operation and would therefore limit the number of applications where chroma-keying of this type may be adopted as a realistic solution to a particular compositing problem.

By default, this selected color value is supplied to a color suppression process 406 as shown in FIG. 4, although other colors may be selected as part of this process. Thus, in order to avoid the bleeding through of the base color in regions where the key is soft, the presence of this color in the foreground is suppressed by process 406.

The output from color suppression process 406 and the background image from 402 are supplied to a blending process 407. The blending process is arranged to select an input from 406, an input from 402 or a mixture of these two inputs in response to the key signal generated by the key generation process 405.

In order to set up a keying procedure, an operator views a selected frame within a video clip. A portion of the background is selected, such as portion 201 shown in FIG. 2, thereby identifying the selected base color to process 405. This background base color should be totally removed from the composite image and replaced with a new background, possibly derived from another video clip. However, the process is complicated by areas of the image where a soft key is required. These include areas such as the wine bottle 202, glass 203 and regions such as region 204, around the guitarists hair.

Figure 5:
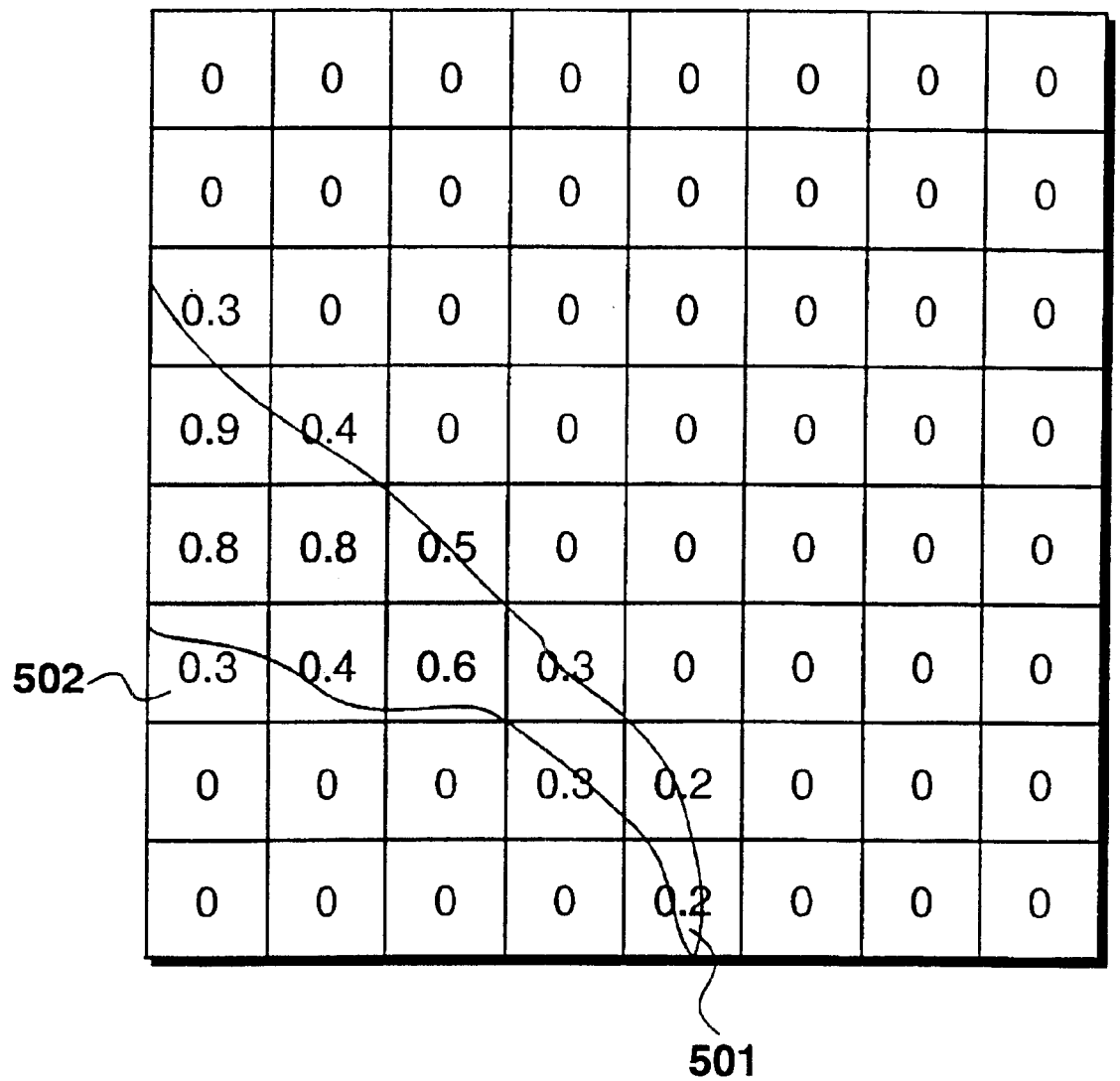
FIG. 5 details a portion of the image illustrated in FIG. 2.

Region 204 is illustrated in FIG. 5 and shows an 8×8 pixel array of key values. The key values are illustrated as ranging between zero and one, where the base color will produce a key value of zero, effectively black, with other regions producing key values greater than zero, up to a maximum of unity. As shown in FIG. 5, most of the pixels have been set to a value of zero, representing the presence of the background base color. However, given the nature of the foreground image, many of the pixels, such as pixel 501 and pixel 502, have a value which is very close to zero, thereby resulting in a level of blending being introduced between the foreground image and the composited background image.

Two images are mixed or composited using an associated key-signal or matte. The key is a monochrome image representing how a composite image is derived from background and foreground images. For any given pixel, the key controls which part of the background and which part of the foreground is to be taken in order to render the corresponding pixel in the resulting image. When the key for a given pixel is completely white, only the foreground image is taken for the resulting pixel and when the key is completely black only the background is taken for the resulting pixel. However for the grey keys, those keys not being pure white or pure black, the resulting pixel will be derived from a percentage of the corresponding foreground pixel and a percentage of the corresponding background pixel.

Figure 6A:
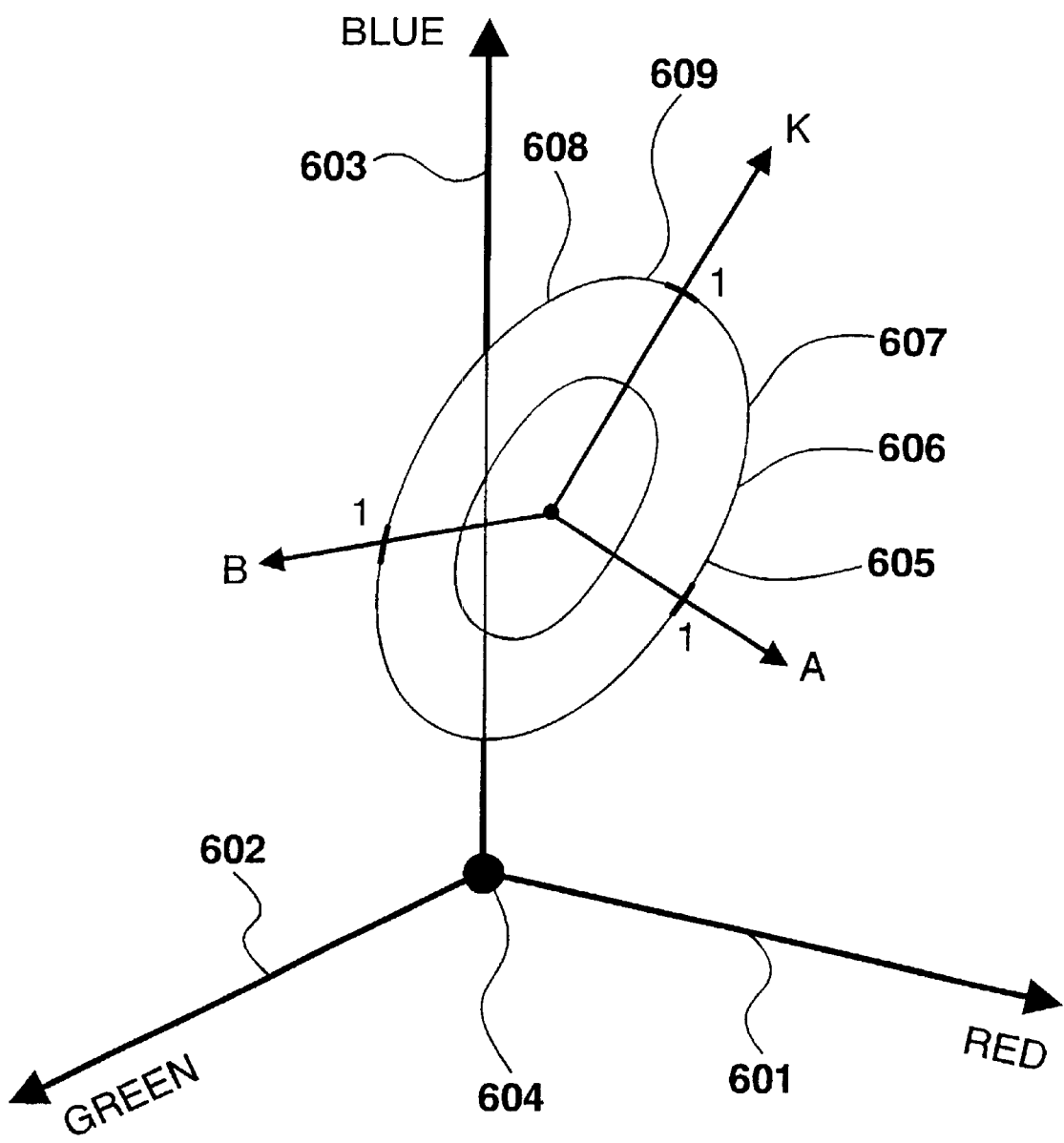
FIG. 6A details displayed colors representing individual pixels scanned from the foreground image, such as the foreground image shown in FIG. 2.

FIG. 6A details displayed colors in RGB color-space corresponding to individual pixels scanned from a foreground image comprising a required foreground shot against a blue background. Red, green and blue color component axes, 601, 602 and 603 respectively are shown with origin 604. In accordance with the present invention, a central point 605 has been determined as representing the blue background, following initial selection of an area of the blue background by manual operations performed by the operator. Point 605 represents the average color of the blue screen which is never perfectly blue but a mix of blue, green and red where blue is the dominant color. Point 605 now forms the origin of a new orthogonal co-ordinate system with axes K, A and B respectively. Pixels derived from the required foreground image are displaced from the blue screen color, origin 605. Regions are established around point 605. Region 606 is identified as a tolerance zone; bounded by a surface 607. Region 608 is identified as a softness zone, bounded by a further outer surface 609. The tolerance zone 606 corresponds to pixels that have RGB color components required to produce a corresponding black matte pixel. Pixels that lie on the surface of the tolerance zone, 607, similarly are required to produce a black matte pixel. All pixels that lie outside the softness zone, that is outside surface 609, are required to produce white matte pixels. In-between surfaces 607 and 609 scanned pixels of the foreground image represent transition pixels which are required to have a level of grey so as to blend foreground and background images in a realistic way in accordance with the present invention the grey levels depend on the distance in color space of the scanned pixel from the color space origin. For a given scanned image the KAB axes are defined relative to the new origin 605 and in accordance with the axes of the ellipse, said ellipse for example being represented by surface 607. Thus the K axis is situated along the major axis of the ellipse as shown. FIG. 6A simply represents the scanned pixel colors in two dimensions, on three-dimensional axes for the purpose of illustration. In reality ellipse 607 and ellipse 609 are three-dimensional ellipsoids.

Ellipsoids bounded by surfaces 607 and 609, are displayed on video monitor 104, allowing a video graphics artist (as shown in FIG. 1) to interactively modify the tolerance and softness surfaces. Thus the video artist may observe certain groups of displayed color data lying close to or on surfaces 607 and 609.

Figure 6B:
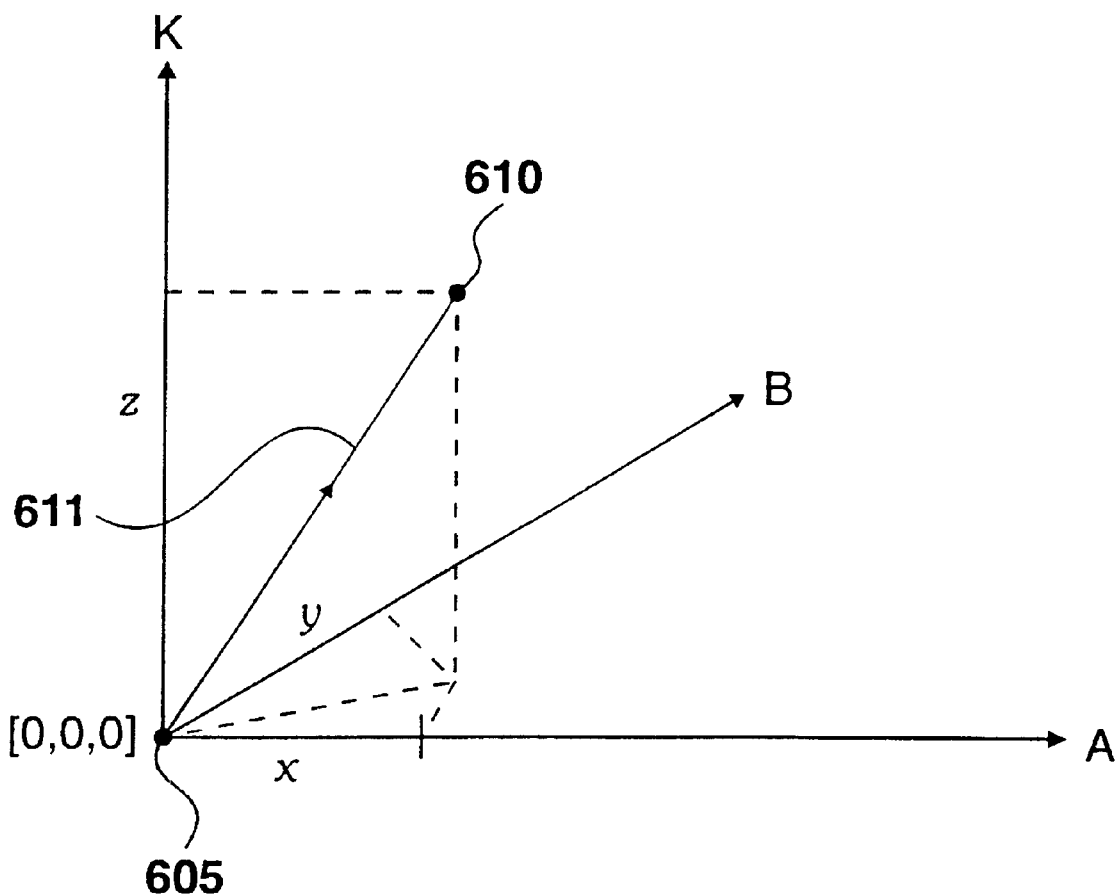
FIG. 6B identifies the distance in KAB color-space between a scanned pixel of the foreground image and the KAB co-ordinate system origin.

FIG. 6B illustrates color-space distance of a scanned pixel of the foreground image from the origin of the KAB color-space co-ordinate system shown in FIG. 6A. The color of the scanned pixel is represented by the point 610. This point lies at a distance 611 from the origin 605 and has color components, x, y and z respectively. The distance 611 is given by Pythagoras's theorem in three-dimensions, equation 612. Thus the distance 611 is given by the square root of the sum of the squares of the color distance components. Thus, it is this equation that is used for calculating distances in color-space relative to a transformed origin.

In an alternative embodiment it may be preferable to calculate color space distances in RGB color-space. In this case a matrix transformation to transform RGB space into KAB color-space where the origin defines the position of the key color is not required. If color-space transformation is not incorporated then calculation of color distances will not be relative to an origin and the color distances of scanned pixel points will be relative to the non-zero point representing the color of the unrequired background. Thus without co-ordinate transformation the values that are squared in equation 611 will correspond to differences in each color component between the point corresponding to the scanned pixel and the point corresponding to the color of the unrequired background.

Figure 7:
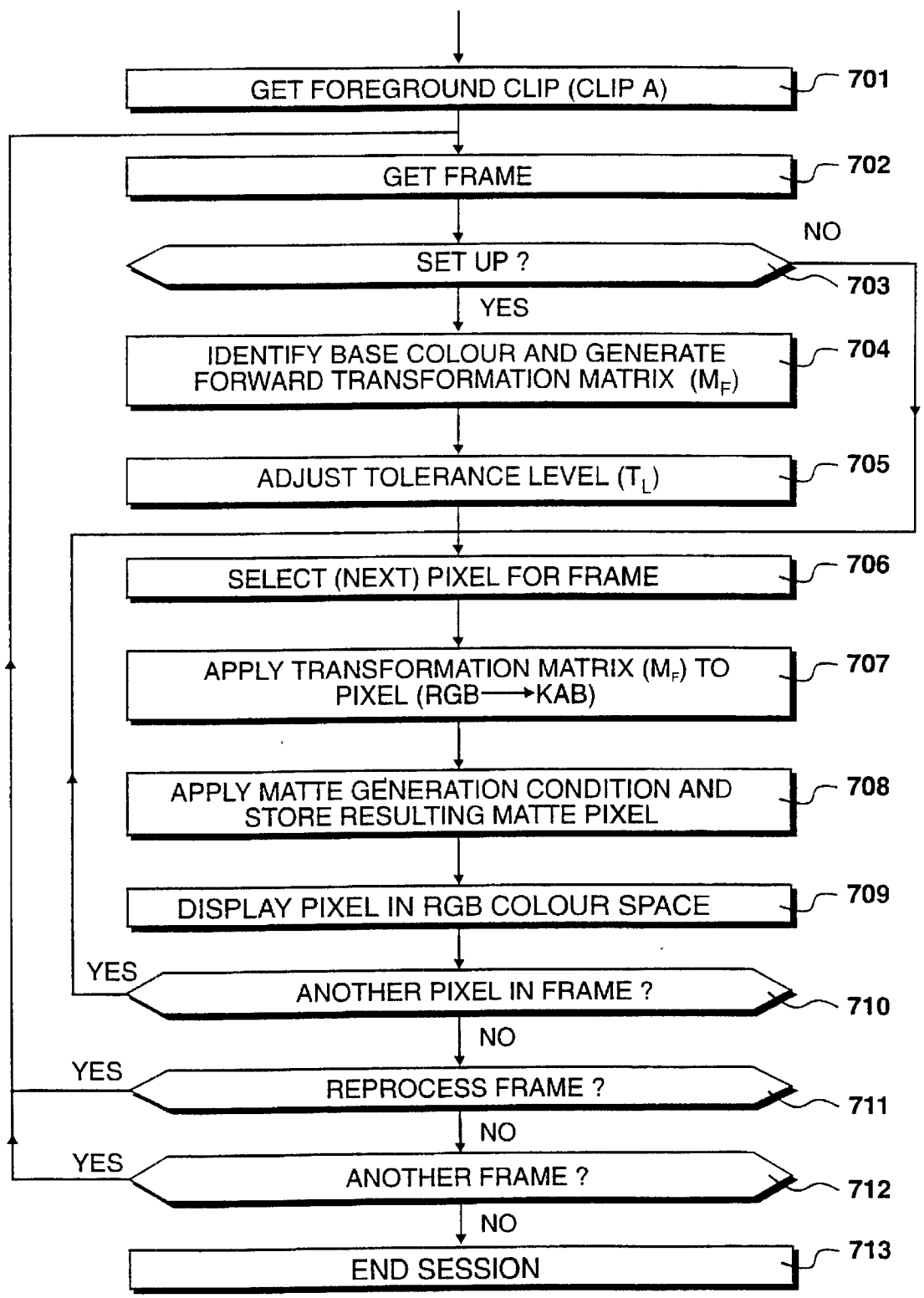
FIG. 7 details the steps involved in key generation process 405, including a step for identifying the base color of the unrequired background and a step for applying a condition required in generation of the matte.

FIG. 7 illustrates the generation of the key signal by key generation process 405. At step 701 processor 101 is instructed to get a foreground clip (clip A) to be processed. At step 702 a frame of clip A is read and at step 703 a question is asked as to whether selection parameters are to be set up. If the question asked at step 703 is answered in the affirmative, a base color is identified at step 704 and a forward transformation matrix (MF) is calculated. Following step 704, the tolerance level may be adjusted in response to instructions provided by the operator, as indicated at step 705. If the question asked at 703 is answered in the negative, then skip steps 704 and 705, and continue processing at step 706.

Following selection of the pixel in step 706, the forward transformation matrix (MF) is applied to the current pixel being processed at step 707, resulting in co-ordinate axes being transformed from RGB color-space to KAB color-space; said axes being defined in FIG. 6A.

At step 708 a key generation condition is applied to the given pixel to create a resulting key pixel which is stored. At step 709 the pixel in question is displayed in RGB color-space, as shown in FIG. 6A. At step 710 a question is asked as to whether there is another pixel in the current frame to be processed. If the question asked at step 710 is answered in the affirmative control returns to step 706 wherein the next pixel for the frame is selected and steps 707, 708 and 709 are repeated. If the question asked at step 710 is answered in the negative a further question is asked at step 711 as to whether the frame is to be reprocessed. This question may be answered by the video artist shown in FIG. 1 and if answered in the affirmative control is returned to step 702 wherein the frame is retrieved and reprocessed in accordance with the steps thereafter. If the question asked at step 711 is answered in the negative a further question is asked at step 712 as to whether there is another frame in the clip to be processed. If this question is answered in the affirmative, control is returned to step 702 wherein the next frame is read. If the question asked at 712 is answered in the negative, the process for the generation of the key signal is terminated at step 713.

Figure 8:
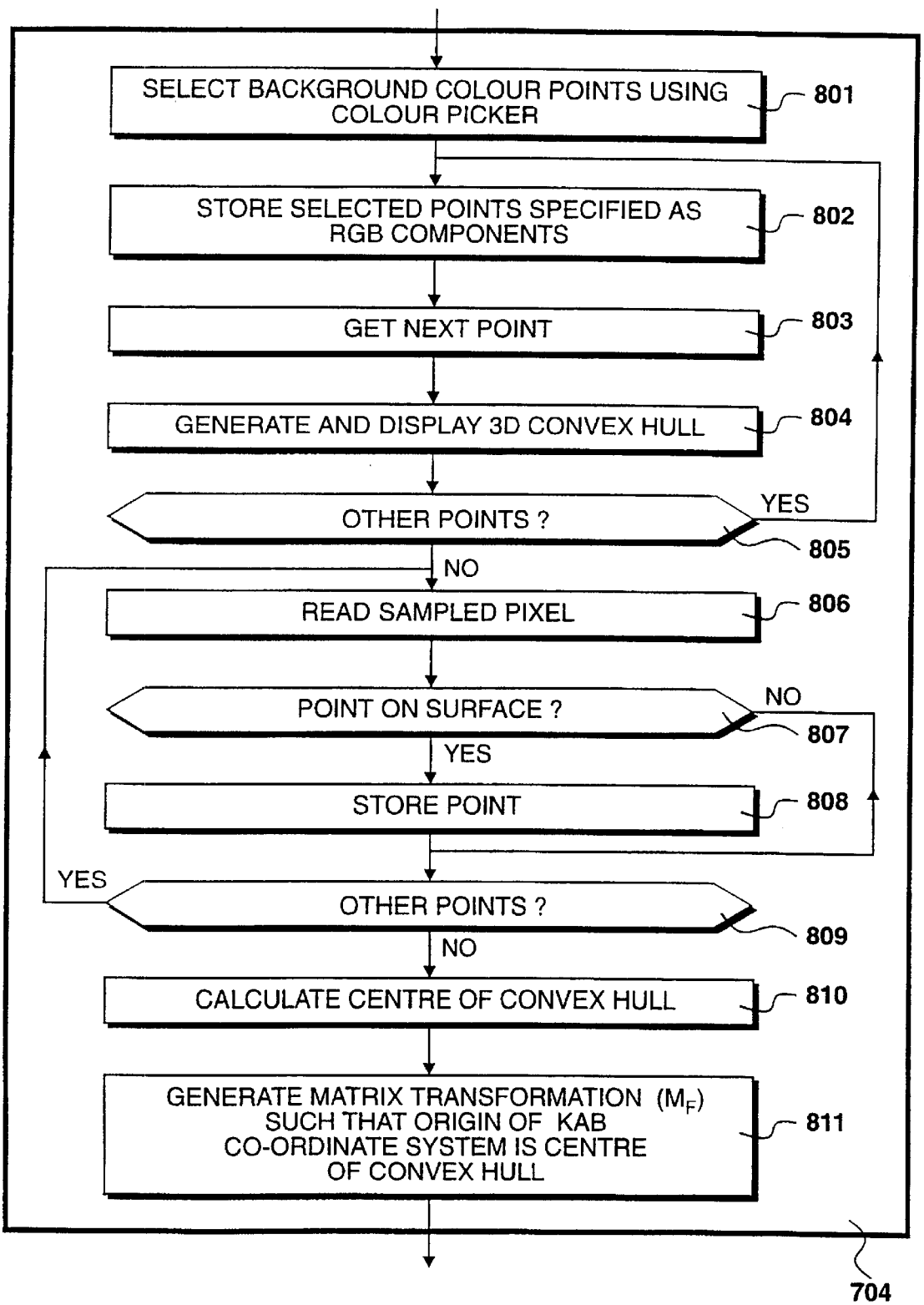
FIG. 8 details the step identified in FIG. 7 relating to identification of the unrequired background or base color.

Procedure 704 for the identification of a base color representing the background of the foreground image, is detailed in FIG. 8. At step 801 the video artist selects background color points using a color picker or stylus 102 on a touch tablet 103. At step 802 the selected points, specified as RGB components, are stored in a buffer. At step 803 processor 101 obtains the next point stored in the buffer. At step 804 the point selected at step 803 is processed so as to form part of a 3-D convex hull. A 3-D convex hull is the smallest convex surface that contains a given set of points. A set of points is convex if for any two points in the set, the points on a straight line segment joining the two points are also contained within the set.

Following step 804 a question is asked at step 805 as to whether there are further selected points to be processed. If this question is answered in the affirmative, control is returned to step 802 wherein steps 802 to 805 are repeated. If the question asked at step 805 is answered in the negative, processor 101 reads a sampled pixel at step 806. A sampled pixel represents a pixel color that has been selected by the video artist. The selected colors are then considered one by one such that only positions in color-space which actually lie on the surface of a three dimensional convex hull are retained. Thus, a question is asked at step 807 as to whether the point lies on the surface of the hull. If the question is answered in the affirmative, control is passed to step 808 wherein the point is stored. Following storage of said point, control is passed to step 809 wherein a further question is asked as to whether there are any other points to be processed. If this question is answered in the affirmative control is returned to step 806 wherein another convex hull point is read and steps 807 to 809 are repeated. If the question asked at step 807 is answered in the negative control is passed to step 809, the point identified not being stored in this case. If the question asked at step 809 is answered in the negative, to the effect that there are no further points in the generated convex hull to be processed, control is passed to step 810 where the centre of the convex hull is calculated. At this point it is also possible to display the shape of the convex hull. Following step 810 a matrix transformation (MF) is generated such that the origin of a new co-ordinate system, the KAB co-ordinate system shown in FIGS. 6A and 6B, is determined as the centre of the convex hull.

Figure 9:
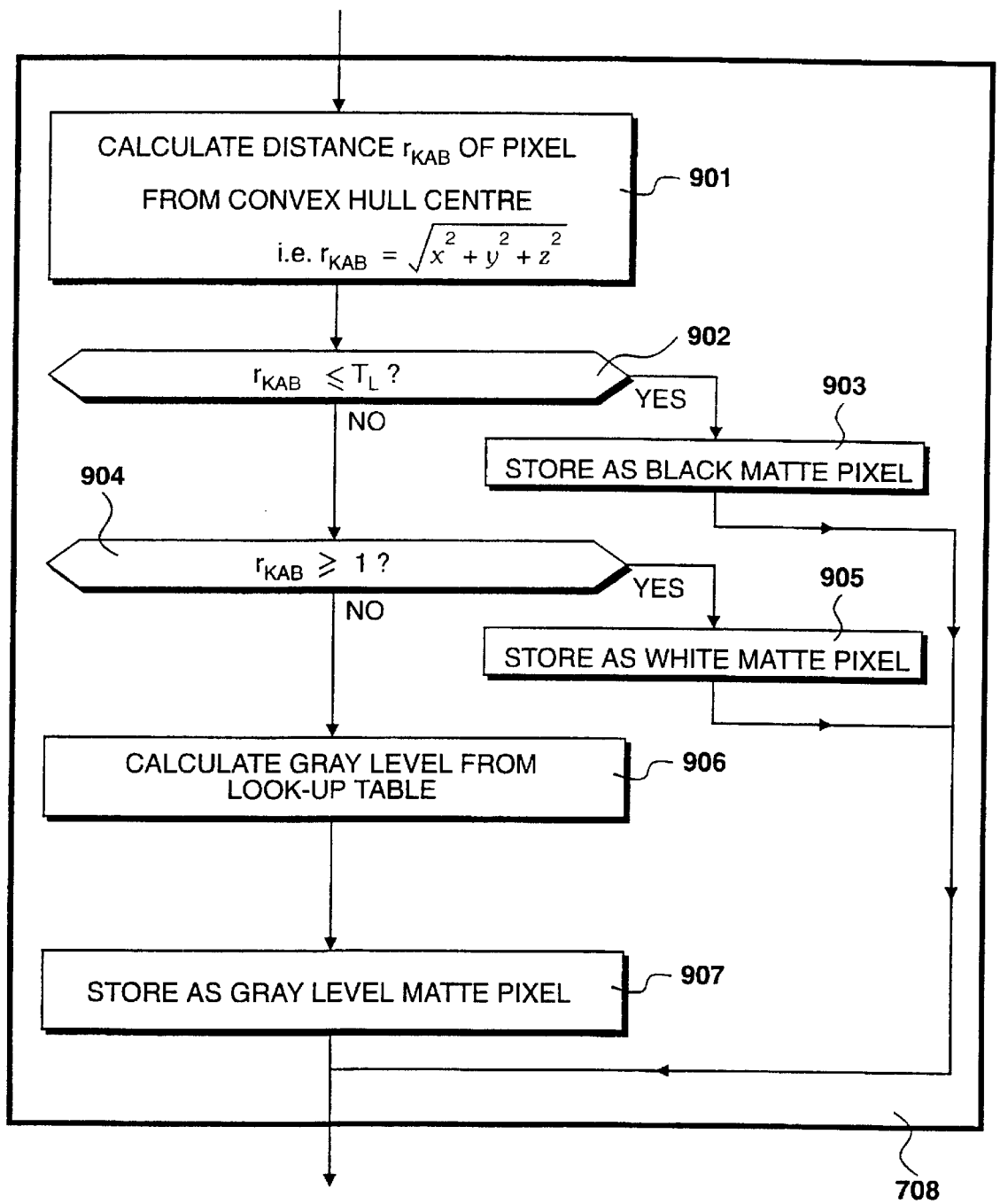
FIG. 9 details the step identified in FIG. 7 relating to application of a condition used in generation of the matte.

Step 708 identified in FIG. 7 relating to application of a matte generation condition with resulting storage of a matte pixel, is detailed in FIG. 9. At step 901 the current pixel under consideration, expressed in KAB co-ordinates, is processed so as to determine the distance of the pixel's color from the convex hull centre. The distance of the color of this pixel is given by Pythagoras' theorem as the square root of the sum of the squares of the color components, wherein the color component distances are the distances in KAB color space as identified in FIG. 6B. At step 902 a question is asked as to whether the color distance calculated at step 901 is less than or equal to the tolerance level set by the video artist at step 705. If this question is answered in the affirmative control is passed to step 903 wherein the pixel generated for the key is stored as a black pixel and thus represents a point on the blue screen background. If the question asked at step 902 is answered in the negative, control is passed to step 904 wherein a question is asked as to whether the distance calculated at step 901 is greater than or equal to unity. This question corresponds to whether the calculated distance is greater than or equal to the surface defining the outer surface of the softness zone, surface 609 shown in FIG. 6A.

If this question is answered in the affirmative, the pixel is interpreted as forming part of the required foreground and therefore the resulting key pixel is set to white at step 905, indicating that no blending with the required background is to be performed for this pixel. If the question asked at step 904 is answered in the negative, control is directed to step 906 where a grey level is calculated using a look-up table for the current pixel. Thus questions resulting in step 906 being implemented are equivalent to a pixel being identified whose color lies in the softness region 608 shown in FIG. 6. Such a pixel may lie on an object boundary and thus will not be appropriate for setting to either black or white. In this case a level of blending is required. Following calculation of the grey level at step 906 the boundary pixel is stored as a grey level matte pixel at step 907. Pixels identified as background pixels are stored as black matte pixels at step 903 and pixels identified as required foreground image pixels are stored as white matte pixels at step 905.

Figure 10:
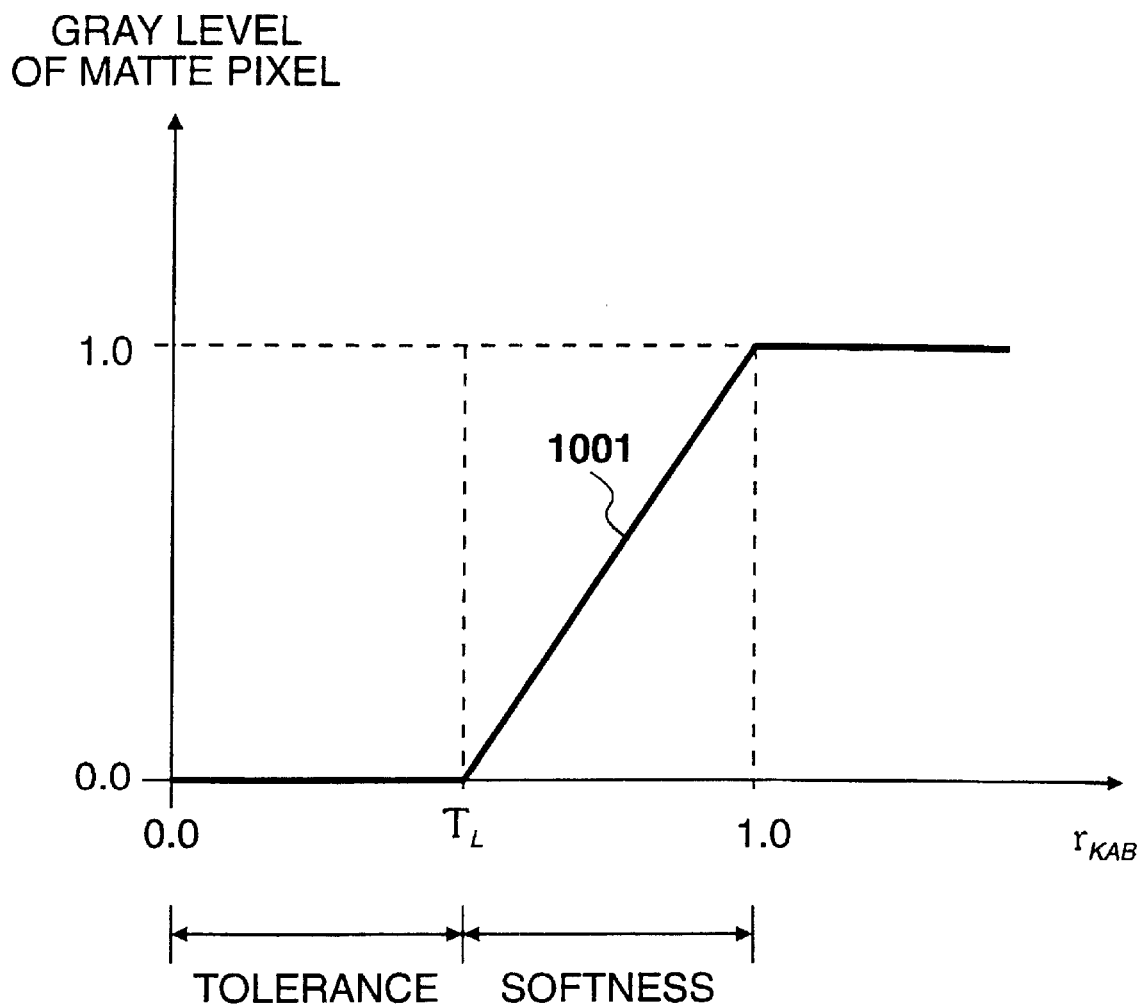
FIG. 10 details a relationship between calculated color distance values and output values stored as matte data, the Figure showing color distances in a softness zone which provide a grey level output.

Step 705 relating to adjustment of a tolerance level is detailed in FIG. 10. In FIG. 6A, the tolerance zone 606 is bounded by surface 607 and the softness zone 608 is bounded by surface 609. FIG. 10 is an example of a function defining the grey level of key pixels resulting from a calculated distance, R. A tolerance level T is defined by a user and provides a limit in terms of calculated distance below which an output key pixel is set to black. Thus calculated distances less than or equal to this limit are output as black on the key. The value T corresponds to the upper limit of color distances for which the current pixel being processed is considered to be part the unrequired background of the foreground image. The softness zone is defined as those color distances greater than T, but less than unity. Pixels being processed which have associated color distances within these bounds are processed such that the resulting output key pixel is given a grey level defined by function 1001. For color distance values greater than or equal to unity the output key pixel is set to white and in this case takes the value of the foreground image pixel color.

The function shown is by way of example only and other similar functions may be defined by the video artist. Thus the video artist may adjust the tolerance level T and also the nature of the function between the limits T and unity. Thus for example a non-linear relationship may be provided between input color distance values and output grey levels for the resulting matte pixels.

As an alternative to providing one matrix and one look-up table for defining tolerance and softness, it is possible to define two ellipses with two different transformation matrices. In this configuration, the first matrix may represent tolerance, which is positioned within a second ellipsis representing softness. In this way, the two ellipses may have different orientations and different centres. They are substantially independent; the only limitation being to the effect that the tolerance ellipsis must be inside the softness ellipsis.

When a matte is being generated, the control value will represent black if the processed pixel lies inside the tolerance ellipsis. Similarly, the matte value will be set to white if the pixel under consideration lies outside the softness ellipsis. In-between, the level of softness will depend upon the distance between the two ellipses calculated in the direction of a normal vector relative to the centre of the tolerance ellipsis.

First image frames are derived from a foreground image comprising a required foreground image recorded against an unrequired background, such that a compositing process results in the unrequired background being substantially replaced by a new required background image. The procedure comprises the following basic steps. Firstly, as described a base color of the unrequired background is identified and defined in three-dimensional color-space. Secondly the foreground image data is processed to determine distance data which represents the distance in color-space of the foreground image data from the identified color. Thirdly the foreground image data is processed with reference to the distance data to produce associated data. The associated data is generally known as the alpha matte or key signal data. Finally the image data, comprising both the foreground and background images, is processed in combination with the associated data to produce output or composite data.

Figure 11A:
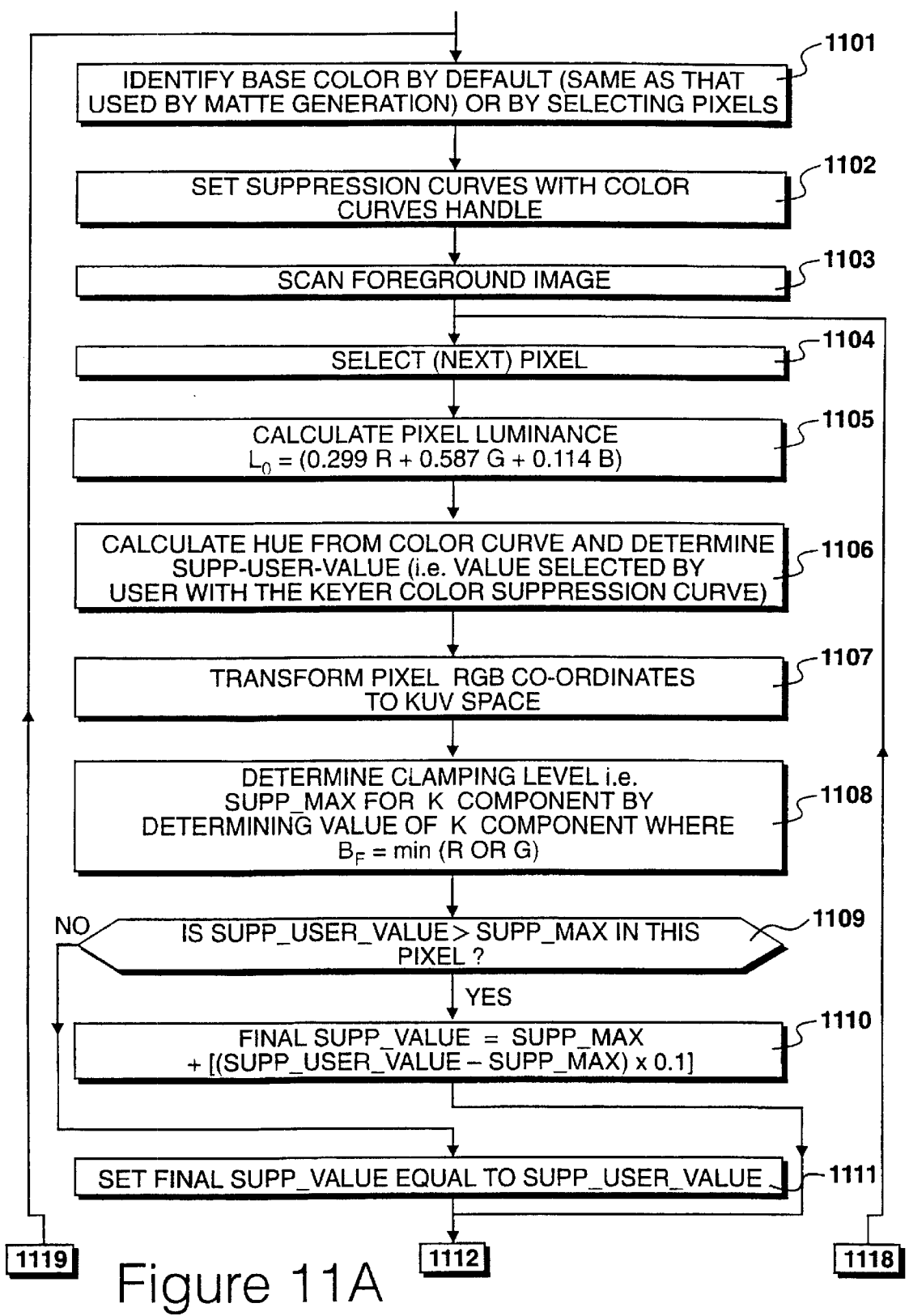
FIGS. 11A and 11B detail the operation of the color suppression process shown in FIG. 4.
Figure 11B:
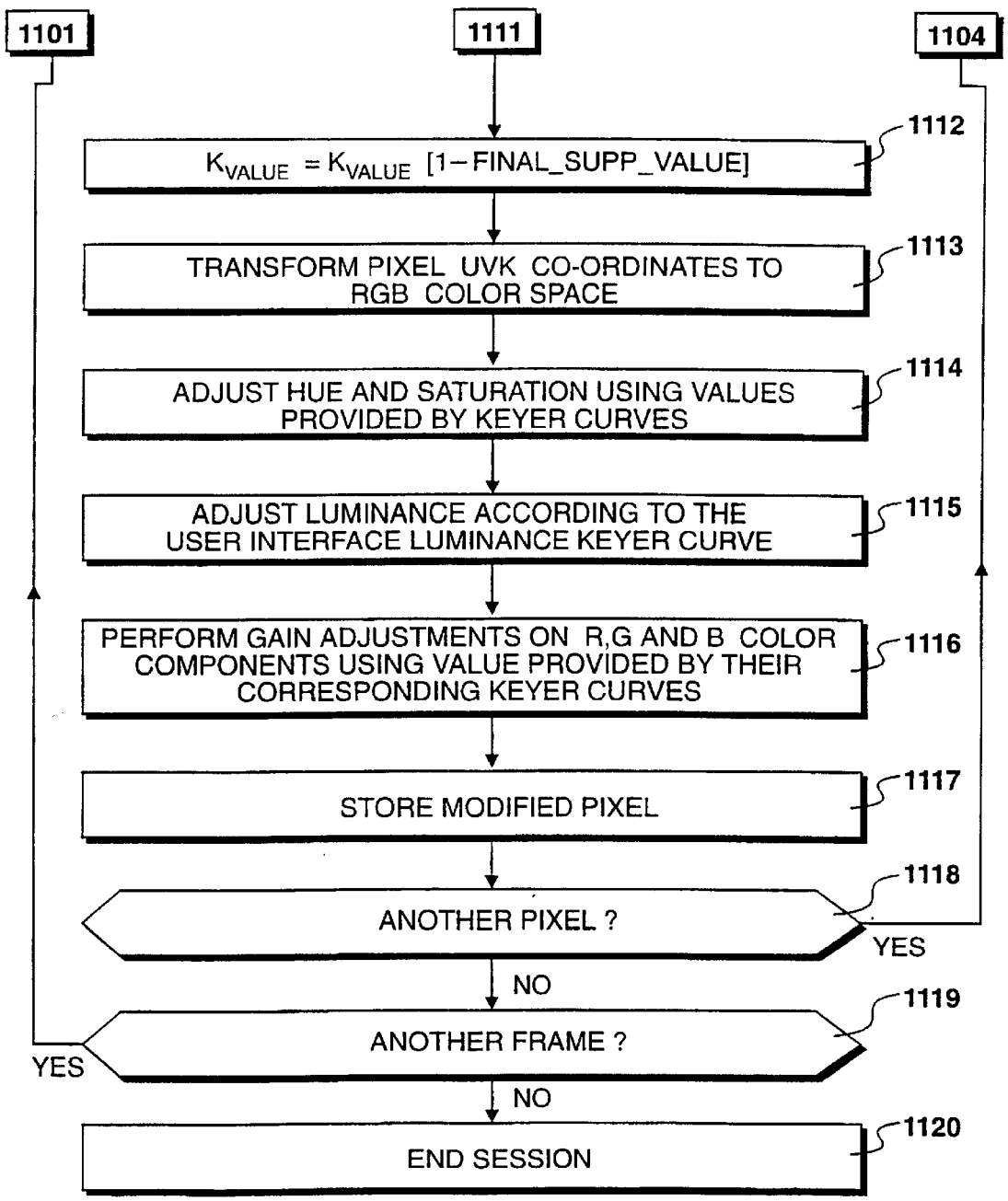

Processes for color suppression 406 are detailed in FIGS. 11A and 11B. At step 1101 a base color is identified which, by default, may be the same color specified for the key generation process 405. Alternatively the base color may be specifically identified for this process, by the video artist selecting pixels on the unrequired background using stylus 102 on touch tablet 103. At step 1102 the video artist is provided with the opportunity to set color suppression curves for defining the degree of color suppression to be performed for particular hues. Following this at step 1103 the foreground image is scanned and at step 1104 the next pixel in the scanned foreground image is selected. At step 1105 the luminance of the selected pixel, Lo is calculated in accordance with the definition of luminance in RGB color-space. Thus as shown the value of the pixel luminance is given by the R, G and B components wherein each component is multiplied by a particular constant. Thus the red component is multiplied by 0.299, the green component is multiplied by 0.587 and the blue component is multiplied by 0.114. At step 1106 the hue of the selected pixel is calculated first to determine the position in terms of color on the color suppression curves set in step 1102.

Hue represents the actual color, such as red, green, purple etc. From a user defined color curve, a color suppression factor is determined. At step 1107 the co-ordinates of the selected pixel are transformed from RGB color-space to an orthogonal KAB color-space. At step 1108 a value is calculated for the K color component. This value represents the value of the K color component for which the corresponding blue component is equal to the minimum of either the red component or the green component. This value acts as an upper limit on the amount of suppression that can be applied to the given pixel and therefore is alternatively called the clamping level.

At step 1109 a question is asked as to whether the maximum allowed suppression is less than the user defined suppression value, that is whether the suppression factor is greater than the maximum value for the pixel under consideration. If this question is answered in the affirmative, a final color suppression value is calculated. This value is calculated at step 1110 and is equal to the maximum value plus an additional quantity. The additional quantity is given by one tenth of the difference between the user value and the maximum value.

If the question asked at step 1109 is answered in the negative, such that the value is not greater than the calculated maximum value, the final suppression value is set equal to the user defined value, that is, it is set to the user value as indicated at step 1111. Following determination of the final suppression value to be applied to the current pixel under consideration, the K color component for the pixel is modified in accordance with the final suppression value calculated. Thus at step 1112 the K color component value is calculated as the original K color component value minus the K color component value multiplied by the final color suppression value. At step 1113 the modified KAB co-ordinates of the current pixel are transformed back to RGB color-space. Thus the RGB components resulting will be modified due to procedures performed at steps 1109 to 1112.

Following step 1113 the hue and saturation of the final RGB components are adjusted, at step 1114, in accordance with values provided by user defined colour curves. At step 1115 the luminance of the resulting colour of a pixel under consideration is similarly adjusted in accordance with luminance curves. At step 1116 gain adjustments are performed on the R, G and B color components, again using values provided by corresponding curves. At step 1117 a modified pixel is stored and at step 1118 a question is asked as to whether there is another pixel to be processed. If this question is answered in the affirmative, control is returned to step 1104 wherein the next pixel is selected. Alternatively if the question asked at step 1118 is answered in the negative a further question is asked at step 1119 as to whether there is another frame in the clip to be processed. If this question is asked in the affirmative, control is returned to step 1101. However if the question asked at step 1119 is answered in the negative, all of the frames in the clip have been processed and the session relating to color suppression is terminated at step 1120.

Figure 12A:
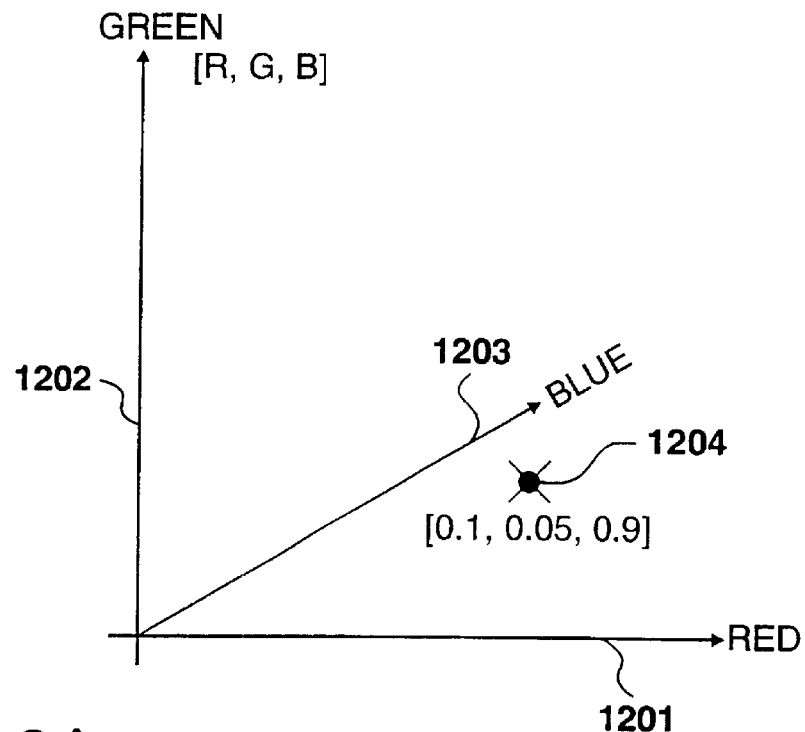
FIGS. 12A and 12B illustrate the relocation of co-ordinate axes in color space as performed in the color suppression process identified in FIGS. 11A and 11B.

Color-space considered by the color suppression process 406 at step 1107 in FIG. 11A is illustrated in FIG. 12A. Particular colors are specified in terms of their red, green and blue components, which may be represented as x, y and z orthogonal axes 1201, 1202 and 1203. A base color has been selected which, preferably, should lie at maximum extent upon the blue axis 1203. However, the selected base color will tend to be slightly off-set from this preferred position and its actual co-ordinate locations may be identified as red being equal to 0.1, green being equal to 0.05 and blue being equal to 0.9.

Figure 12B:
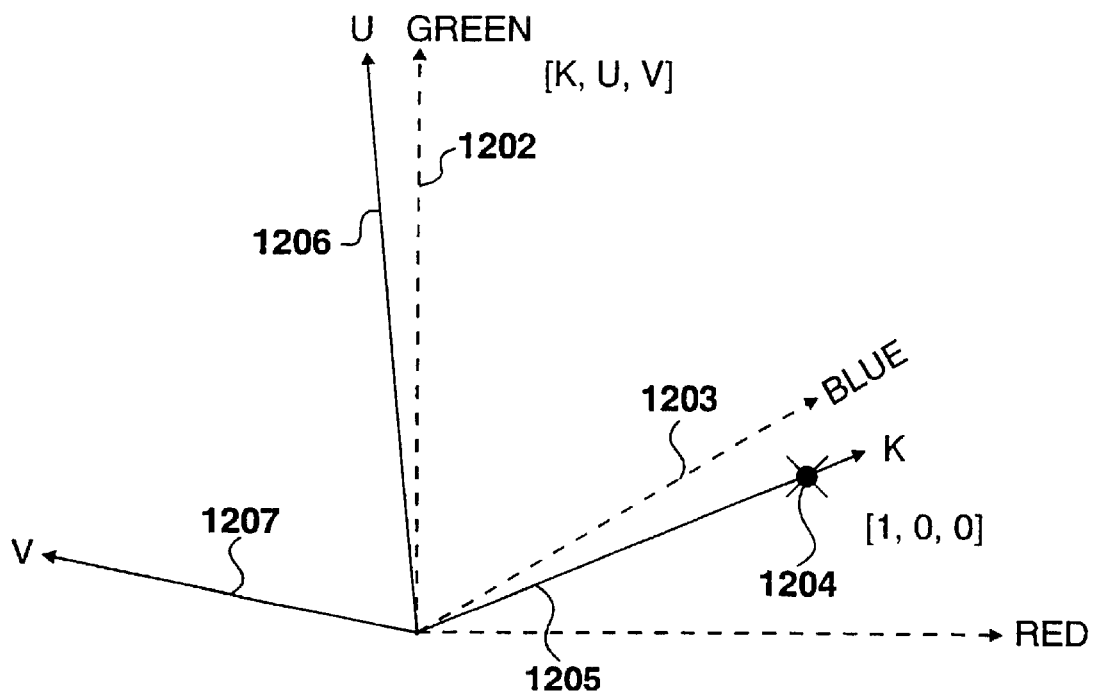

In the embodiment, colors within the color-space are redefined with reference to a new orthogonal K, A, B set of axes, as shown in FIG. 12B. The K axis is rotated such that it now intersects the identified base color 1204 which is now identified as a new color-space co-ordinate K. The axes maintain their orthogonal relationship, resulting in similar transformations being effected on the A and B axes. Thus, colors within the color-space may now be defined with reference to the new co-ordinate frame where each location consists of three components specified as the K in combination with an A component and a B component.

The transformation of the new color-space definition is completed by scaling the axes so that the selected position 1204 occupies a co-ordinate location of 1, 0, 0 in the new co-ordinate frame. This scaling is effected uniformly throughout the reference frame, so as to achieve similar scaling with respect to the A and B axes.

The transformation required in order to move the red, green and blue axes onto the KAB axes (which in accordance with transformation theory may require two rotations and a scaling operation to be performed) is calculated such that the mathematical transformation, possibly defined in terms of a transformation matrix, may be applied to other colors within an input video source such that these colors are defined in terms of KAB color-space as an alternative to being defined in RGB color-space.

The procedures identified in FIG. 11 from steps 1108 to 1112 may be implemented within the original RGB color-space although it has been found that more desirable results are obtained, by making a modification to a new view of color-space, more sympathetic with the base color. However, it should be appreciated that the transformation into the new color-space may result in some color regions being specified using negative numbers.

Thus, as far as the color suppression process 405 is concerned, it is necessary to generate a forward matrix (mF) in order to achieve the transformation of coefficient definitions as illustrated in FIG. 12(*b*). Within the color suppression process 406, matrix mF is therefore used to generate color suppression terms within the KAB color-space. However after suppression in this color-space has taken place, it is necessary to redefine the image in conventional RGB color-space so that it may be blended, in blending process 407, with the background image 402. Consequently, within the color suppression process 406 it is also necessary to calculate the reverse or backward matrix (mB) for converting data defined as KAB into data defined as RGB. Matrices mF and mB are populated by concatenating the transformation matrices representing a first rotation, a second rotation and a scaling.

The particular nature of the rotation will depend upon the dominant component of the identified base color. If the dominant component of the selected base color is blue, the rotation of axes RGB is performed about the green axis, followed by rotation about the red axis. The angles of rotation about these respective axes are calculated in accordance with the equations shown in FIG. 13(*a*). A temporary variable C is calculated, following Pythagoras, by calculating the square root of the sum of the blue component squared plus the red component squared. The value of the angle of rotation about the green axis is then calculated by negating the arc cosine of the blue component value divided by the temporary variable C. This is followed by rotation about the red axis, as illustrated in FIG. 13(a). The positive arc cosine is determined from the result of dividing temporary variable C by the square root of $C^2$ plus the green value squared. Finally, the whole space is scaled by dividing by the blue component value.

Similar procedures are effected if the dominant color is green or red, as defined in FIGS. 13B and 13C respectively.

Figure 14:
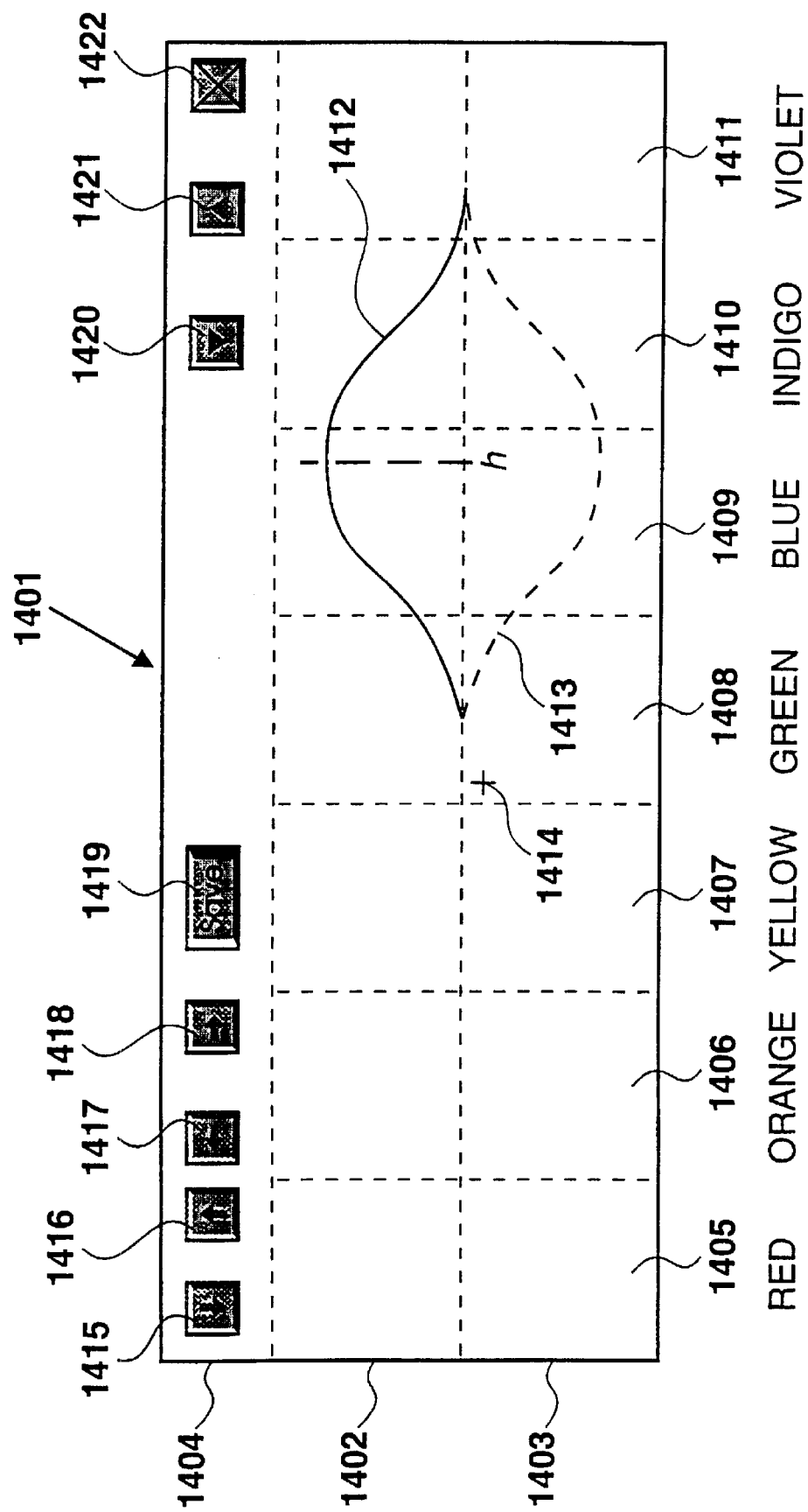
FIG. 14 details a typical color suppression curve for a scanned portion of unrequired background on a foreground image.

The suppression curves set by an operator at step 1102 in FIG. 11 are illustrated in FIG. 14. A typical window 1401 facilitating a suppression modification by a video operator is shown.

Window 1401 comprises three rows, 1402, 1403 and 1404 respectively. Row 1402 displays the colors identified as components of the unrequired background color. Rows 1402 and 1403 are subdivided into columns 1405 representing red, 1406 representing orange, 1407 representing yellow, 1408 representing green, 1409 representing blue, 1410 representing indigo and 1411 representing violet. Thus, columns 1405 to 1411 represent a continuous color spectrum. As indicated by curve 1412, representing said identified colors, the most dominant color in the background has a hue, h, slightly off-set from the centre of the blue column 1409. Other hues are incorporated in the scanned background color and therefore a distribution of colors is observed. Row 1403 displays a curve generated by the computer to negate the background color distribution 1412. The color suppression curve 1413 is calculated as the inverse of curve 1412.

Curve 1413 may be modified through commands issued by the video operator via the control buttons present in row 1404. Curve 1413 may therefore be modified in response to actions performed by the operator to manipulate the position of the screen pointer (cursor) 1414. Thus cursor 1414 may be moved down or up in response to the video operator selecting the down-arrow button 1415 or up-arrow button 1416 respectively. Similarly the operator may move cursor 1414 in the left or right direction via selection of buttons 1417 and 1418 respectively. Button 1419 is a save button so that the manipulations performed to curve 1413 by the video operator may be saved for use in processing a video frame currently being processed. Buttons 1420 to 1422 are standard window buttons relating respectively to decreasing window size (1420), increasing window size (1421) and closing the window (1422). Thus after the video operator has specified desirable modifications to the color suppression curve 1413 the window may be closed by the operator clicking on button 1422 via use of a mouse.

Color-space transformations effected by color suppression process 406 are performed using matrices as detailed in FIG. 15. Thus, step 1107 in FIG. 11A relating to transformation of pixel RGB co-ordinates to KAB-space is effected by a forward transformation matrix 1501 which operates on pixel color component data including control data 1502 to produce new co-ordinate data 1503. Similarly the following color suppression steps 1108 to 1112 in FIGS. 11A and 11B KAB color-space information 1503 is transformed using a matrix 1504 to create color suppressed or final RGB data 1505. The backwards matrix 1504 is effectively the inverse matrix of forward matrix 1501.

Calculation of clamping levels for maximum suppression values for a K color component of a given pixel being processed occurs at step 1108 in FIG. 11A. This step is performed in accordance with the matrix manipulations identified in FIG. 16. Thus at step 1601, denoting the maximum allowable suppression by SUPP_MAX, the maximum suppression is defined as the final blue component wherein said component is equal to the minimum of either the final red component or the final green component. Thus, for example, where the minimum of the red and green components is determined to be red then BF is set equal to RF.

At step 1602 the final blue component is given by the sum of the K, A and B color components, each said component multiplied by the appropriate backward matrix element given by matrix 1505. Thus, the blue component occurring in the third row of matrix 1505 is given by the third row of matrix 1503 multiplied by the third row of matrix 1504. Similarly the red component, RF, is given by the first row of matrix 1503 multiplied the first row of matrix of 1504 in accordance with the rules of matrix multiplication.

At step 1603 the corresponding value of the K component for the case when the final blue component is equal to the final red component is given by equating the two equations shown in step 1602. At step 1604 the maximum suppression, SUPP_MAX is calculated. Thus the value KB=R is equal to the K component of the pixel being processed multiplied by 1 minus the maximum suppression allowable. Rearranging this equation yields the maximum allowable suppression, SUPP_MAX as equal to the K component for the case when the blue component is equal to the red component divided by the K component for the current pixel, the resulting value being subtracted from unity. The calculation required to yield the value for SUPP_MAX is detailed in step 1605. Step 1605 shows the actual calculation performed, this being the equation shown in step 1604 with the value 4KB=R substituted from the value determined in step 1603.

Figure 17:
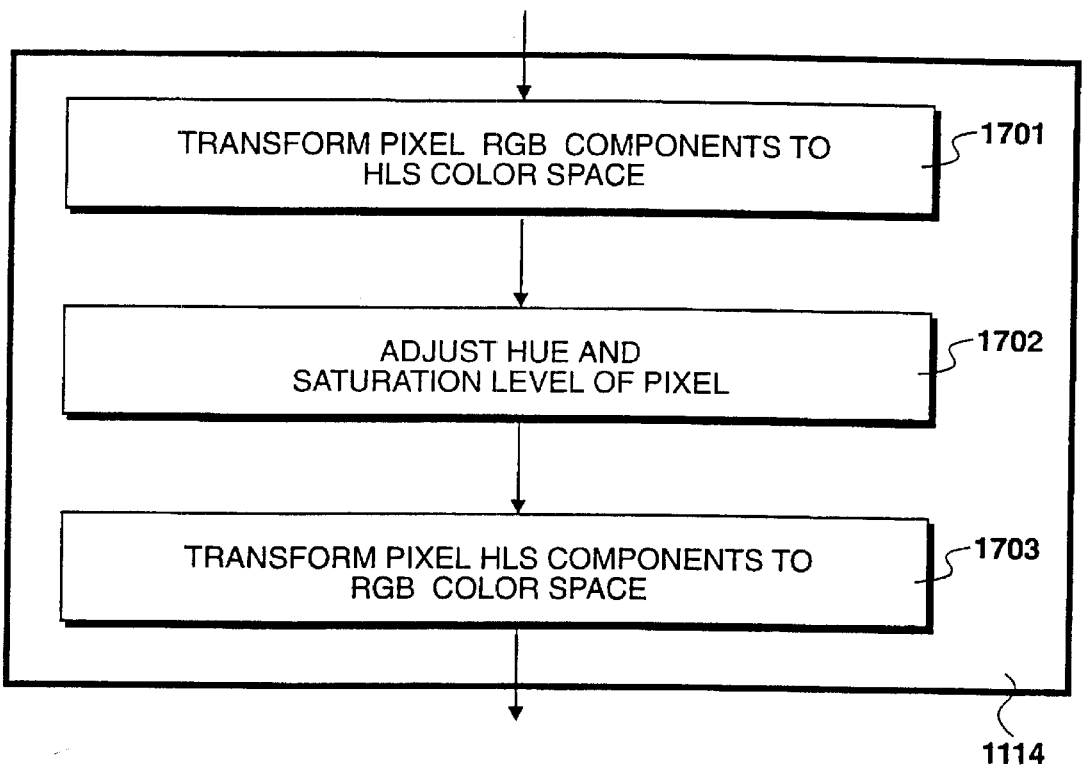
FIG. 17 details procedures for adjustment of hue and saturation as performed in the color suppression process shown in FIGS. 11A and 11B.

Process 1114 for the adjustment of hue and saturation is detailed in FIG. 17. At step 1701 pixel components represented in RGB color-space are transformed to representations in hue, luminance and saturation (HLS) space. At step 1702 the hue and saturation levels are adjusted and at step 1703 the pixel is re-transformed back into RGB color-space.

Figure 18:
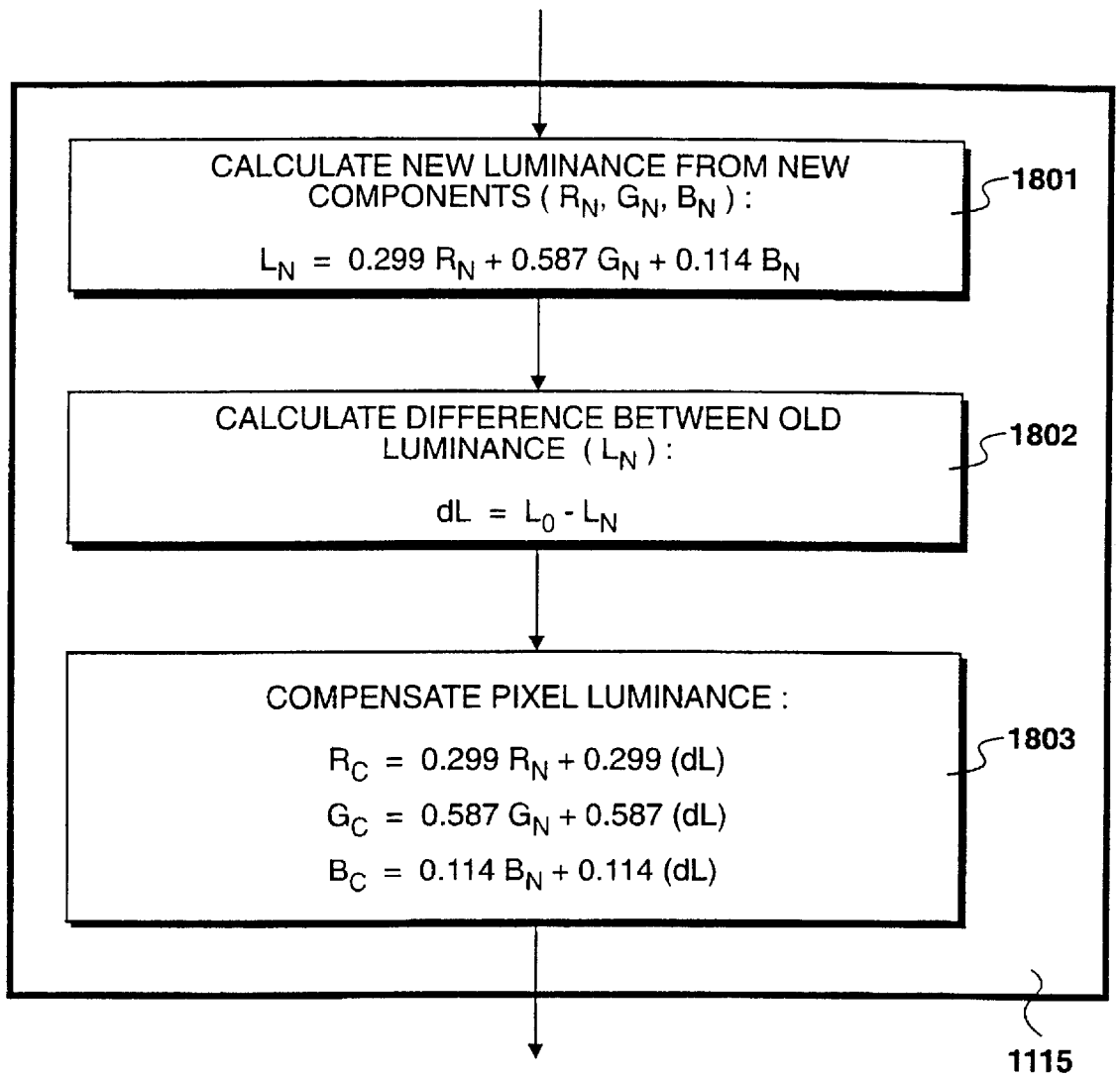
FIG. 18 illustrates procedures followed in luminance restoration as performed in the color suppression process shown in FIGS. 11A and 11B.

Process 1115 for the adjustment of luminance is detailed in FIG. 18. At step 1801 a new luminance value is calculated from new components of R, G and B. The new luminance value is derived from scaling factors for each of the red, green and blue components which, as shown in FIG. 18, consist of 0.299 for red, 0.587 for green and 0.114 for blue.

At step 1802 a difference dL is calculated by subtracting the new luminance value from the previous luminance value. Thereafter, at step 1803 pixel luminance values are compensated by adding appropriately scaled components with respect to the difference value calculated at step 1802.

Figure 19:
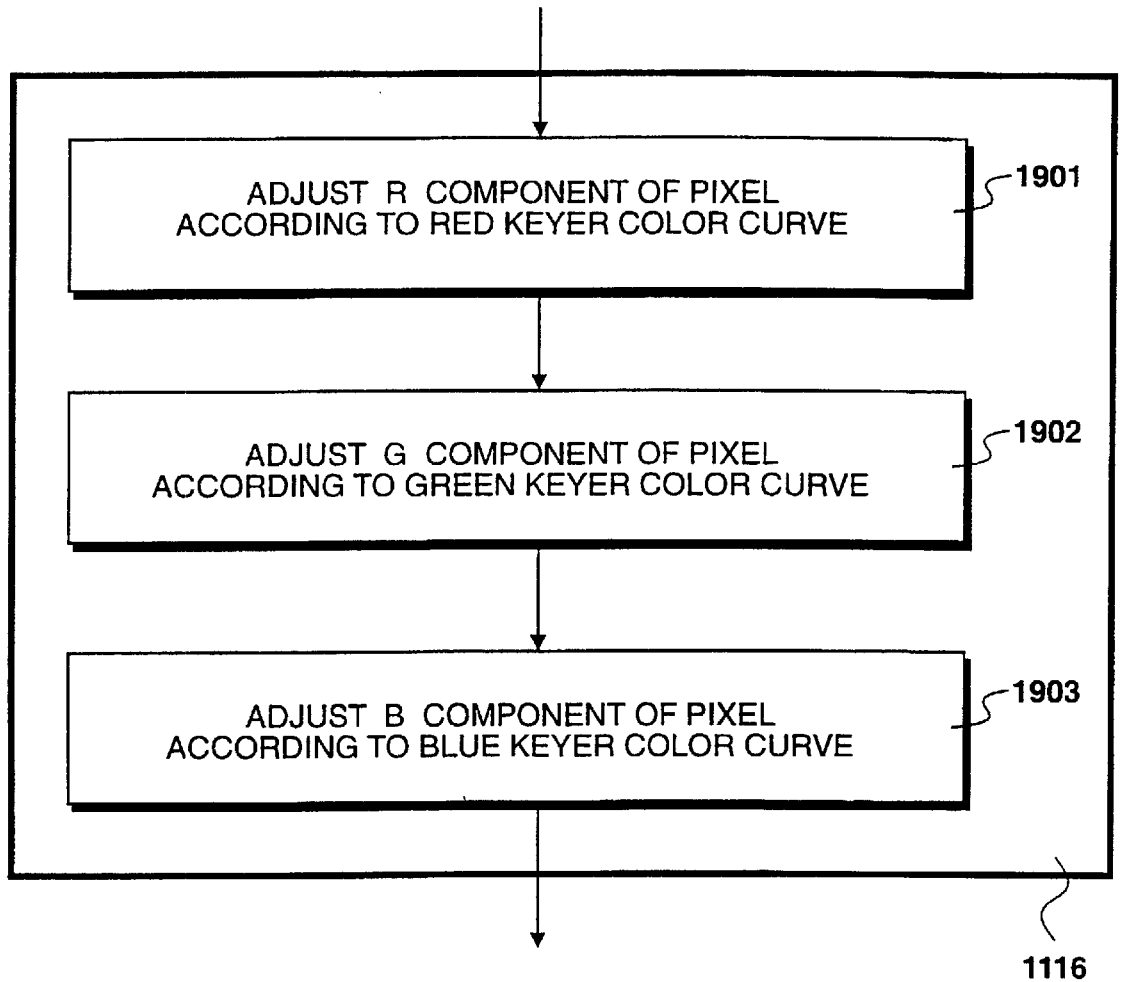
FIG. 19 shows procedures involved in the adjustment of R, G and B color components following luminance restoration shown in FIG. 16.
Figure 7:
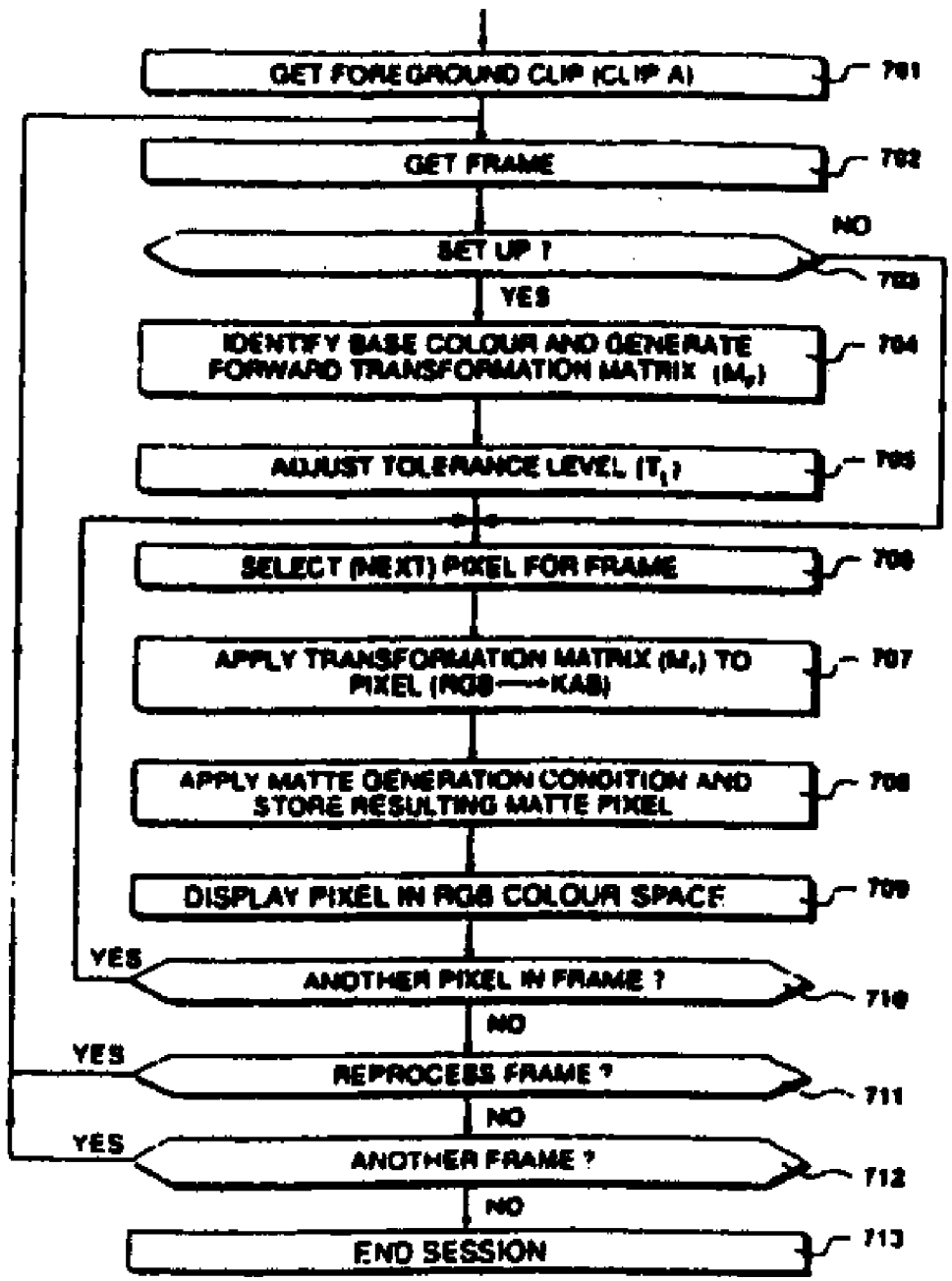
Figure 11A:
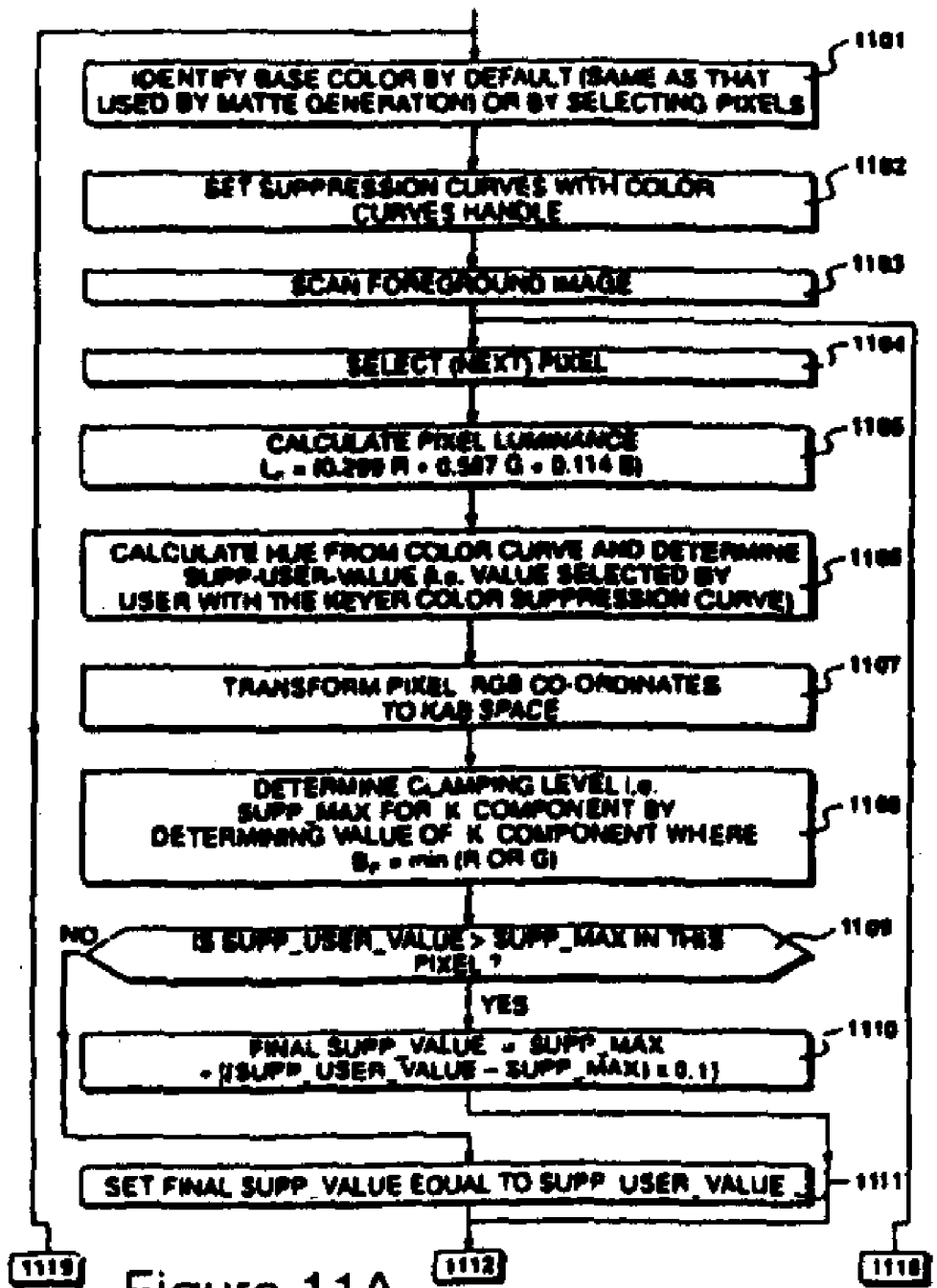
Figure 11B:
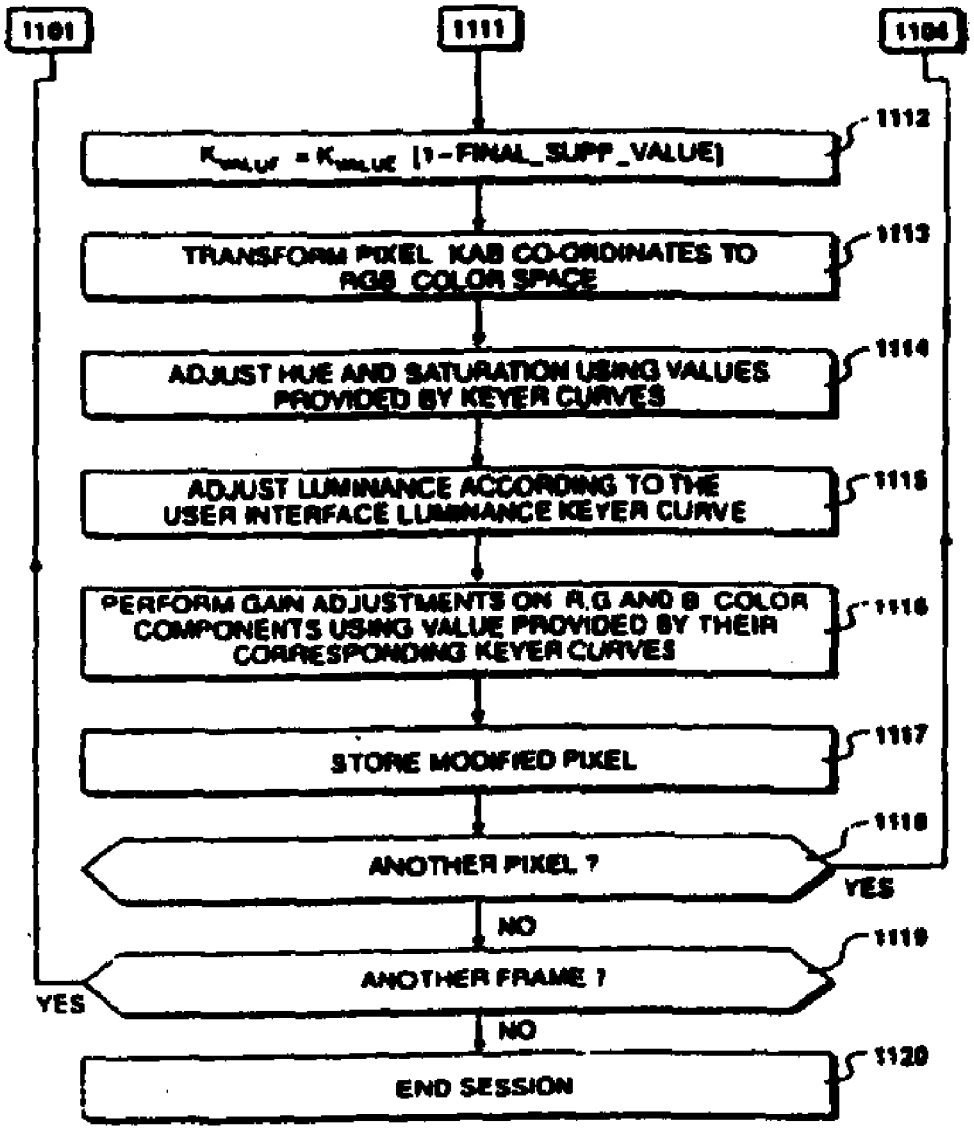
Figure 12A:
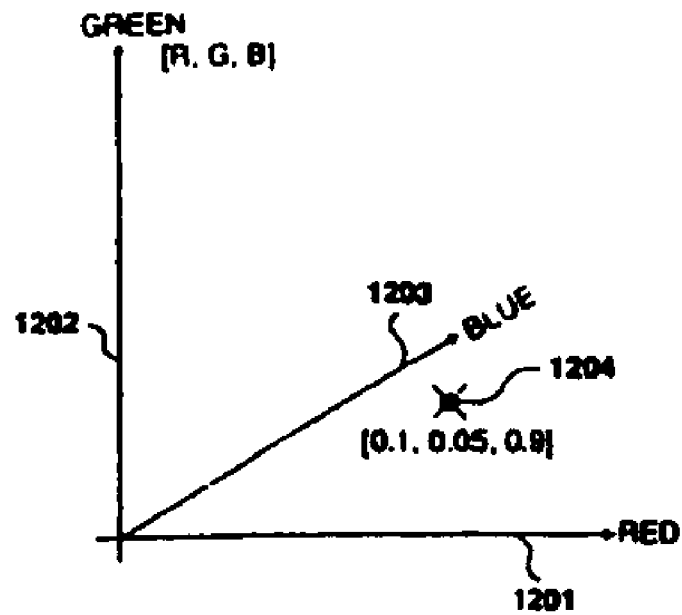
Figure 12B:
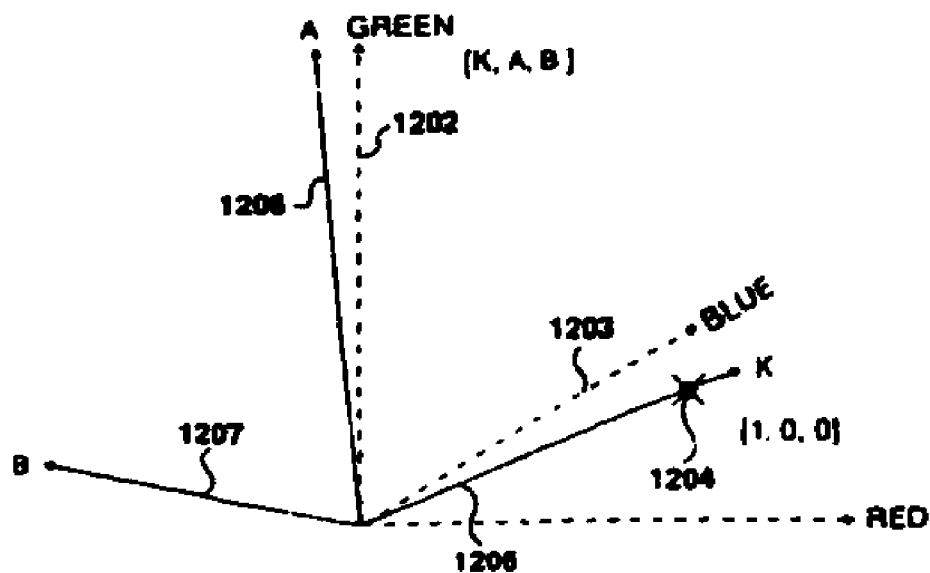

Process 1116 for performing gain adjustments is detailed in FIG. 19. At step 1901 a red component of the pixel is adjusted in accordance with manually defined color curves. Similarly, at step 1902 the green component is adjusted and at step 1903 the blue component is adjusted.

The present embodiments allow for chroma-key, chroma-matte and chroma-suppress signals to be generated from sophisticated manipulations performed within absolute color-space. This is particularly useful when effecting post-production procedures to generate alpha signals or control signals from source material that has been recorded under less than ideal conditions. It can reduce the number of passes required in order to generate a chroma-key and, ultimately, may allow keys to be generated from source material which would not otherwise allow for keying of this type.

What is claimed is:

1. A method of merging first image data with second image data, the second image data being obtained separately from the first image data, in which each image data has a plurality of pixels and each pixel is represented by three color components defining a position within a color-space, comprising:

(a) identifying a background base color to be replaced in the first image data;

(b) calculating a distance in three-dimensional color-space between a foreground input color in the first image data and the background base color; and (c) producing a control value in relation to said calculated distance, wherein:
  (i) the control value is used to merge the first image data with the second image data;
  (ii) the control value indicates that a first image data pixel is part of background to be replaced if the calculated distance is within a tolerance zone;
  (iii) the control value indicates the first image data pixel is part of required foreground if the calculated distance is outside of a softness zone; and
  (iv) the control value indicates a level of blending if the calculated distance is within the softness zone.

2. A method according to claim 1, wherein said color-space coordinates represent positions on an orthogonal set of axes and said distance is calculated from the sum of each component squared.

3. A method according to claim 2, wherein said control value is calculated from the square root of said sum.

4. A method according to claim 1, wherein color-space coordinates are transformed onto an alternative set of orthogonal axes.

5. A method according to claim 4, wherein said transformation is performed with reference to said background base color.

6. A method according to claim 1, wherein said background base color is determined from a set of manually selected colors.

7. A method according to claim 6, wherein said background base color is derived by forming a convex hull around said selected colors.

8. A method according to claim 1, wherein said control value is used to suppress color in areas of color spill.

9. A method according to claim 1, wherein said control value is used to generate a keying signal.

10. Image data compositing apparatus including means for merging first image data with second image data in which the first image data and the second image data are obtained separately and each has a plurality of pixels and each pixel is represented by three color components defining a position within a color-space, comprising:

(a) means for identifying a background base color to be replaced in the first image;

(b) calculating means for calculating distance in three-dimensional color-space between a foreground input color in the first image and said background base color; and (c) means for producing a control value in relation to said calculated distance, wherein:
  (i) the control value is used to merge the first image data with the second image data;
  (ii) the control value indicates that a first image data pixel is part of background to be replaced if the calculated distance is within a tolerance zone;
  (iii) the control value indicates the first image data pixel is part of required foreground if the calculated distance is outside of a softness zone; and
  (iv) the control value indicates a level of blending if the calculated distance is within the softness zone.

11. Apparatus according to claim 10, including means for calculating said distance as the sum of each component squared, wherein said components are defined on an orthogonal set of axes.

12. Apparatus according to claim 11, wherein said calculating means is configured to calculate the square root of said sum.

13. Apparatus according to claim 10, including means for transforming said color-space coordinates onto an alternative set of orthogonal axes.

14. Apparatus according to claim 13, wherein said means for performing said transformation is configured to perform said transformation with reference to said background base color.

15. Apparatus according to claim 10, including manually operable means for selecting said background base-color.

16. Apparatus according to claim 15, including means for deriving a background base color with reference to a convex hull constructed around selected colors.

17. Apparatus according to claim 10, including means for suppressing color signals in areas of color spill under the control of said control value.

18. Apparatus according to claim 10, including means for keying video signals in response to said control signal.

* * * * *

UNITED STATES PATENT AND TRADEMARK OFFICE
CERTIFICATE OF CORRECTION

PATENT NO.   : 6,445,816 B1
DATED        : September 3, 2002
INVENTOR(S)  : Pettigrew It is certified that error appears in the above-identified patent and that said Letters Patent is hereby corrected as shown below:

Drawings,
Delete drawings sheets 8, 12, 13, 14, 18 and 19, and susbtitute therefore, drawing sheets 8, 12, 13, 14, 18 and 19. (attached).

Signed and Sealed this

Third Day of May, 2005

JON W. DUDAS
*Director of the United States Patent and Trademark Office*

$$1502 \sim \begin{bmatrix} R_i \\ G_i \\ B_i \\ A \end{bmatrix} \times \underbrace{mF}_{1501} = \begin{bmatrix} A \\ B \\ K \\ 1 \end{bmatrix} \sim 1503$$

$$1503 \sim \begin{bmatrix} A \\ B \\ K \\ 1 \end{bmatrix} \times \underbrace{mB}_{1504} = \begin{bmatrix} R_F \\ G_F \\ B_F \\ A \end{bmatrix} \sim 1505$$

$$1501 = \begin{bmatrix} i_{00,F} & i_{10,F} & i_{20,F} & i_{30,F} \\ i_{01,F} & i_{11,F} & i_{21,F} & i_{31,F} \\ i_{02,F} & i_{12,F} & i_{22,F} & i_{32,F} \\ i_{03,F} & i_{13,F} & i_{23,F} & i_{33,F} \end{bmatrix}$$

$$1504 = \begin{bmatrix} i_{00,B} & i_{10,B} & i_{20,B} & i_{30,B} \\ i_{01,B} & i_{11,B} & i_{21,B} & i_{31,B} \\ i_{02,B} & i_{12,B} & i_{22,B} & i_{32,B} \\ i_{03,B} & i_{13,B} & i_{23,B} & i_{33,B} \end{bmatrix}$$

Figure 15

LET MAXIMUM ALLOWABLE SUPPRESSION BE DENOTED BY SUPP_MAX

FOR MAXIMUM ALLOWABLE SUPPRESSION
$B_F$ = MINIMUM ( $R_F$ OR $G_F$ )

FOR THE CASE WHERE MINIMUM ( $R_F$ OR $G_F$ ) = $R_F$,
$B_F$ = $R_F$       — 1601

(a) $B_F = A \cdot i_{02.8} + B \cdot i_{12.8} + K_{B \cdot R} \cdot i_{22.8} + i_{32.8}$
(b) $R_F = A \cdot i_{00.8} + B \cdot i_{10.8} + K_{B \cdot R} \cdot i_{20.8} + i_{30.8}$       — 1602

SUBSTITUTING EQUATIONS 2 (a) AND 2 (b) IN $B_F = R_F$ GIVES :

$$K_{B \cdot R} = \frac{A \cdot i_{02.8} + B \cdot i_{12.8} + i_{32.8} - (A \cdot i_{00.8} + B \cdot i_{10.8} + i_{30.8})}{(i_{20.8} - i_{22.8})}$$       — 1603

SUPP_MAX IS GIVEN BY :
$K_{B \cdot R} = K ( 1 - \text{SUPP\_MAX} )$
OR : $\text{SUPP\_MAX} = 1 - \dfrac{K_{B \cdot R}}{K}$       — 1604

SUBSTITUTING EQUATION 3 IN EQUATION 4 GIVES :

$$\text{SUPP\_MAX} = 1 - \frac{A \cdot i_{02.8} + B \cdot i_{12.8} + i_{32.8} - (A \cdot i_{00.8} + B \cdot i_{10.8} + i_{30.8})}{K \cdot (i_{20.8} - i_{22.8})}$$       — 1605

Figure 16